US012453346B2

(12) United States Patent
Ankenbauer et al.

(10) Patent No.: US 12,453,346 B2
(45) Date of Patent: Oct. 28, 2025

(54) STABILIZATION OF WHOLE BLOOD AT ROOM TEMPERATURE

(71) Applicant: Roche Diagnostics Operations, Inc., Indianapolis, IN (US)

(72) Inventors: Waltraud Ankenbauer, Mannheim (DE); Ulrike Dietrich-Veenstra, Iffeldorf (DE); Renate Kolb, Iffeldorf (DE); Yvonne Maerz, Murnau (DE); Stephanie Wessner, Farchant (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 236 days.

(21) Appl. No.: 17/061,711

(22) Filed: Oct. 2, 2020

(65) Prior Publication Data

US 2021/0015092 A1 Jan. 21, 2021

Related U.S. Application Data

(63) Continuation of application No. 15/221,791, filed on Jul. 28, 2016, now abandoned, which is a (Continued)

(30) Foreign Application Priority Data

Jan. 30, 2014 (EP) ..................... 14153199

(51) Int. Cl.
*A01N 1/02* (2006.01)
*A01N 1/126* (2025.01)
(52) U.S. Cl.
CPC .................... *A01N 1/126* (2025.01)
(58) Field of Classification Search
CPC ............... A01N 1/0226; A01N 1/126
See application file for complete search history.

(56) References Cited

U.S. PATENT DOCUMENTS

2007/0020607 A1\* 1/2007 Meryman ................ A01N 1/02
435/2
2007/0275364 A1 11/2007 Hassanein et al.
(Continued)

FOREIGN PATENT DOCUMENTS

WO 199716967 A1 5/1997
WO 199926582 A1 6/1999
(Continued)

OTHER PUBLICATIONS

Birk et al. The Mitochondrial-Targeted Compound SS-31 Re-Energizes Ischemic Mitochondria by Interacting with Cardiolipin J. Am Soc Nephrol 24: 1250-1261, 2013 (Year: 2013).\*
(Continued)

*Primary Examiner* — Tracy Vivlemore
*Assistant Examiner* — Lauren K Van Buren
(74) *Attorney, Agent, or Firm* — Taft Stettinius & Hollister LLP

(57) ABSTRACT

The present disclosure is directed to the stabilization of nucleated cells in a whole blood sample ex-vivo, effected by an additive being a liquid composition for stabilizing an analyte in intact nucleated cells of a whole-blood sample ex-vivo, the composition being an aqueous solution, the solution comprising an anticoagulant, a phosphate salt, a cell-metabolizable sugar, adenine, and an antioxidant, wherein the antioxidant comprises a mitochondria-targeted antioxidant, preferably a mitochondria-targeted antioxidant selected from the group consisting of SkQ1, MitoQ, SS-31, and a mixture thereof. In a specific embodiment, the liquid composition further comprises a protease inhibitor. Further provided is advantageous use of the composition for stabilizing an analyte selected from DNA, RNA and protein in intact nucleated cells of the whole-blood sample ex-vivo, as well as kits including the composition for practicing said
(Continued)

use. Additionally, specific methods are provided for stabilizing intact nucleated cells of a whole-blood sample ex-vivo.

10 Claims, 5 Drawing Sheets

Specification includes a Sequence Listing.

Related U.S. Application Data continuation of application No. PCT/EP2015/051658, filed on Jan. 28, 2015.

(56) References Cited

U.S. PATENT DOCUMENTS

| | | | |
|---|---|---|---|
| 2008/0017194 A1* | 1/2008 | Hassanein | A01N 1/02 |
| | | | 128/200.24 |
| 2009/0252726 A1 | 10/2009 | Jiao et al. | |
| 2010/0003748 A1 | 1/2010 | Baker | |
| 2011/0256522 A1 | 10/2011 | Ericson et al. | |
| 2012/0244518 A1 | 9/2012 | MacMillan-Crow | |
| 2013/0209985 A1* | 8/2013 | Hoke | B01L 3/5021 |
| | | | 435/307.1 |

FOREIGN PATENT DOCUMENTS

| | | | | |
|---|---|---|---|---|
| WO | 2005072523 A2 | 8/2005 | | |
| WO | 2008097461 A2 | 8/2008 | | |
| WO | 2013015420 A1 | 1/2013 | | |
| WO | WO-2013116702 A1 * | 8/2013 | | A01N 1/0226 |

OTHER PUBLICATIONS

Kohl Isolation of Genomic DNA from Mammalian Cells Chapter 13, Methods of Enzymology, vol. 529 (Year: 2013).*

Antonenko et al., Mitochondria-Targeted Plastoquinone Derivatives as Tools to Interrupt Execution of the Aging Program. 1. Cationic Plastoquinone Derivatives: Synthesis and in vitro Studies, Biochemistry (Moscow), 2008, pp. 1273-1287, vol. 73, No. 12.

Baechler et al., Expression levels for many genes in human peripheral blood cells are highly sensitive to ex Vivo incubation, Genes and Immunity, 2004, pp. 347-353, vol. 5.

Elliott et al., The UK Biobank sample handling and storage protocol for the collection, processing and archiving of human blood and urine, International Journal of Epidemiology, 2008, pp. 234-244, vol. 37.

Marthandan et al., An investigation of the effects of MitoQ on human peripheral mononuclear cells, Free Radical Research, 2011, pp. 351-358, vol. 45, No. 3.

Olson et al., Shipping blood to a central laboratory in multicenter clinical trials: effect of ambient 6 emperature on specimen temperature, and effects of temperature on mononuclear cell yield, viability and immunologic Function, Journal of Translational Medicine, 2011, 13 pps., vol. 9, No. 26.

Szeto, Hazel; Mitochondria-Targeted Cytoprotective Peptides for Ischemia-Reperfusion Injury; Antioxidants & Redox Signaling; 2008, vol. 10, No. 3, 20-pages.

Tanner et al., Substantial changes in gene expression level due to the storage temperature and storage duration of human whole blood, Clinical Laboratory, 2002, pp. 337-341, vol. 24.

Whiteman et al., Do Mitochondriotropic Antioxidants Prevent Chlorinative Stress-Induced Mitochondrial and Cellular Injury?, Antioxidants & Redox Signaling, 2008, pp. 641-650, vol. 10, No. 3.

International Search Report, European Patent Office, International Patent Application No. PCT/EP2015/051658, Apr. 13, 2015, 5 pages.

Written Opinion of the International Searching Authority, European Patent Office, International Patent Application No. PCT/EP2015/051658, Apr. 13, 2015, 6 pages.

International Preliminary Report on Patentability, European Patent Office, International Patent Application No. PCT/EP2015/051658, Aug. 2, 2016, 7 pages.

Livak et al., Analysis of Relative Gene Expression Data Using Real-Time Quantitative PCR and the 22DDCT Method, Methods 2001, 25(4) 402-408.

* cited by examiner

SEQUENCE LISTING

```
<160> NUMBER OF SEQ ID NOS: 59

<210> SEQ ID NO 1
<211> LENGTH: 18
<212> TYPE: DNA
<213> ORGANISM: Artificial Sequence
<220> FEATURE:
<223> OTHER INFORMATION: oligonucleotide

<400> SEQUENCE: 1
acctgaggag acggtgac                                                 18

<210> SEQ ID NO 2
<211> LENGTH: 21
<212> TYPE: DNA
<213> ORGANISM: Artificial Sequence
<220> FEATURE:
<223> OTHER INFORMATION: oligonucleotide

<400> SEQUENCE: 2
tggggttttg acctttagag a                                             21

<210> SEQ ID NO 3
<211> LENGTH: 25
<212> TYPE: DNA
<213> ORGANISM: Artificial Sequence
<220> FEATURE:
<223> OTHER INFORMATION: oligonucleotide

<400> SEQUENCE: 3
ctctgggtgg gtctgtgttg aaaca                                         25

<210> SEQ ID NO 4
<211> LENGTH: 20
<212> TYPE: DNA
<213> ORGANISM: Artificial Sequence
<220> FEATURE:
<223> OTHER INFORMATION: oligonucleotide

<400> SEQUENCE: 4
ggttaagcac aacagcaaca                                               20

<210> SEQ ID NO 5
<211> LENGTH: 18
<212> TYPE: DNA
```

```
<213> ORGANISM: Artificial Sequence
<220> FEATURE:
<223> OTHER INFORMATION: oligonucleotide

<400> SEQUENCE: 5
cacctgaccc ttgtacgt                                                    18

<210> SEQ ID NO 6
<211> LENGTH: 32
<212> TYPE: DNA
<213> ORGANISM: Artificial Sequence
<220> FEATURE:
<223> OTHER INFORMATION: oligonucleotide

<400> SEQUENCE: 6
cacagtcact gacaccaacg ataatcctcc ga                                    32

<210> SEQ ID NO 7
<211> LENGTH: 20
<212> TYPE: DNA
<213> ORGANISM: Artificial Sequence
<220> FEATURE:
<223> OTHER INFORMATION: oligonucleotide

<400> SEQUENCE: 7
cccctggtgc tccatgagga                                                  20

<210> SEQ ID NO 8
<211> LENGTH: 24
<212> TYPE: DNA
<213> ORGANISM: Artificial Sequence
<220> FEATURE:
<223> OTHER INFORMATION: oligonucleotide

<400> SEQUENCE: 8
ctcatcttct tgttcctcct caga                                             24

<210> SEQ ID NO 9
<211> LENGTH: 22
<212> TYPE: DNA
<213> ORGANISM: Artificial Sequence
<220> FEATURE:
<223> OTHER INFORMATION: oligonucleotide

<400> SEQUENCE: 9
acaccgccca ccaccagcag cg                                               22

<210> SEQ ID NO 10
<211> LENGTH: 20
<212> TYPE: DNA
<213> ORGANISM: Artificial Sequence
<220> FEATURE:
<223> OTHER INFORMATION: oligonucleotide

<400> SEQUENCE: 10
gtttgcggac tgcacttcag                                                  20

<210> SEQ ID NO 11
<211> LENGTH: 24
<212> TYPE: DNA
<213> ORGANISM: Artificial Sequence
<220> FEATURE:
<223> OTHER INFORMATION: oligonucleotide

<400> SEQUENCE: 11
aggattcacc tttaacatct tttt                                             24
```

<210> SEQ ID NO 12
<211> LENGTH: 27
<212> TYPE: DNA
<213> ORGANISM: Artificial Sequence
<220> FEATURE:
<223> OTHER INFORMATION: oligonucleotide

<400> SEQUENCE: 12
tgagaataat gttatcacta ttgatct                                        27

<210> SEQ ID NO 13
<211> LENGTH: 26
<212> TYPE: DNA
<213> ORGANISM: Artificial Sequence
<220> FEATURE:
<223> OTHER INFORMATION: oligonucleotide

<400> SEQUENCE: 13
atttctgaaa tgttttgca gattta                                          26

<210> SEQ ID NO 14
<211> LENGTH: 20
<212> TYPE: DNA
<213> ORGANISM: Artificial Sequence
<220> FEATURE:
<223> OTHER INFORMATION: oligonucleotide

<400> SEQUENCE: 14
tggcacatca ctcacgctga                                                20

<210> SEQ ID NO 15
<211> LENGTH: 25
<212> TYPE: DNA
<213> ORGANISM: Artificial Sequence
<220> FEATURE:
<223> OTHER INFORMATION: oligonucleotide

<400> SEQUENCE: 15
attaagttca ggccaggatc tgtgg                                          25

<210> SEQ ID NO 16
<211> LENGTH: 18
<212> TYPE: DNA
<213> ORGANISM: Artificial Sequence
<220> FEATURE:
<223> OTHER INFORMATION: oligonucleotide

<400> SEQUENCE: 16
ccgtccatgc ggaagatc                                                  18

<210> SEQ ID NO 17
<211> LENGTH: 20
<212> TYPE: DNA
<213> ORGANISM: Artificial Sequence
<220> FEATURE:
<223> OTHER INFORMATION: oligonucleotide

<400> SEQUENCE: 17
gaagacctcc tcctcgcact                                                20

<210> SEQ ID NO 18
<211> LENGTH: 24
<212> TYPE: DNA
<213> ORGANISM: Artificial Sequence
<220> FEATURE:

```
<223> OTHER INFORMATION: oligonucleotide

<400> SEQUENCE: 18
tctgttcctc gcagacctcc agca                                              24

<210> SEQ ID NO 19
<211> LENGTH: 18
<212> TYPE: DNA
<213> ORGANISM: Artificial Sequence
<220> FEATURE:
<223> OTHER INFORMATION: oligonucleotide

<400> SEQUENCE: 19
acagcccagg gaaacctc                                                     18

<210> SEQ ID NO 20
<211> LENGTH: 20
<212> TYPE: DNA
<213> ORGANISM: Artificial Sequence
<220> FEATURE:
<223> OTHER INFORMATION: oligonucleotide

<400> SEQUENCE: 20
ggatgggaac ggtgtagaga                                                   20

<210> SEQ ID NO 21
<211> LENGTH: 22
<212> TYPE: DNA
<213> ORGANISM: Artificial Sequence
<220> FEATURE:
<223> OTHER INFORMATION: oligonucleotide

<400> SEQUENCE: 21
tgatgacacc aatatcacac ga                                                22

<210> SEQ ID NO 22
<211> LENGTH: 22
<212> TYPE: DNA
<213> ORGANISM: Artificial Sequence
<220> FEATURE:
<223> OTHER INFORMATION: oligonucleotide

<400> SEQUENCE: 22
ggcttgtagg cctttttactt cc                                               22

<210> SEQ ID NO 23
<211> LENGTH: 20
<212> TYPE: DNA
<213> ORGANISM: Artificial Sequence
<220> FEATURE:
<223> OTHER INFORMATION: oligonucleotide

<400> SEQUENCE: 23
ggttaagcac aacagcaaca                                                   20

<210> SEQ ID NO 24
<211> LENGTH: 18
<212> TYPE: DNA
<213> ORGANISM: Artificial Sequence
<220> FEATURE:
<223> OTHER INFORMATION: oligonucleotide

<400> SEQUENCE: 24
cacctgaccc ttgtacgt                                                     18
```

```
<210> SEQ ID NO 25
<211> LENGTH: 32
<212> TYPE: DNA
<213> ORGANISM: Artificial Sequence
<220> FEATURE:
<223> OTHER INFORMATION: oligonucleotide

<400> SEQUENCE: 25
cacagtcact gacaccaacg ataatcctcc ga                                  32

<210> SEQ ID NO 26
<211> LENGTH: 18
<212> TYPE: DNA
<213> ORGANISM: Artificial Sequence
<220> FEATURE:
<223> OTHER INFORMATION: oligonucleotide

<400> SEQUENCE: 26
caggaccaag caacatgg                                                  18

<210> SEQ ID NO 27
<211> LENGTH: 24
<212> TYPE: DNA
<213> ORGANISM: Artificial Sequence
<220> FEATURE:
<223> OTHER INFORMATION: oligonucleotide

<400> SEQUENCE: 27
cacatctcca tcacttatct cctt                                           24

<210> SEQ ID NO 28
<211> LENGTH: 30
<212> TYPE: DNA
<213> ORGANISM: Artificial Sequence
<220> FEATURE:
<223> OTHER INFORMATION: oligonucleotide

<400> SEQUENCE: 28
tgcagtcgtc agcctgaaca taacatcctt                                     30

<210> SEQ ID NO 29
<211> LENGTH: 20
<212> TYPE: DNA
<213> ORGANISM: Artificial Sequence
<220> FEATURE:
<223> OTHER INFORMATION: oligonucleotide

<400> SEQUENCE: 29
cccctggtgc tccatgagga                                                20

<210> SEQ ID NO 30
<211> LENGTH: 24
<212> TYPE: DNA
<213> ORGANISM: Artificial Sequence
<220> FEATURE:
<223> OTHER INFORMATION: oligonucleotide

<400> SEQUENCE: 30
ctcatcttct tgttcctcct caga                                           24

<210> SEQ ID NO 31
<211> LENGTH: 22
<212> TYPE: DNA
<213> ORGANISM: Artificial Sequence
<220> FEATURE:
<223> OTHER INFORMATION: oligonucleotide
```

```
<400> SEQUENCE: 31
acaccgccca ccaccagcag cg                                           22

<210> SEQ ID NO 32
<211> LENGTH: 20
<212> TYPE: DNA
<213> ORGANISM: Artificial Sequence
<220> FEATURE:
<223> OTHER INFORMATION: oligonucleotide

<400> SEQUENCE: 32
cgggacaaga ttcttggtgc                                              20

<210> SEQ ID NO 33
<211> LENGTH: 21
<212> TYPE: DNA
<213> ORGANISM: Artificial Sequence
<220> FEATURE:
<223> OTHER INFORMATION: oligonucleotide

<400> SEQUENCE: 33
cgtactgatt tcctcctcat g                                            21

<210> SEQ ID NO 34
<211> LENGTH: 23
<212> TYPE: DNA
<213> ORGANISM: Artificial Sequence
<220> FEATURE:
<223> OTHER INFORMATION: oligonucleotide

<400> SEQUENCE: 34
accaagtttg agacggaaca ggc                                          23

<210> SEQ ID NO 35
<211> LENGTH: 20
<212> TYPE: DNA
<213> ORGANISM: Artificial Sequence
<220> FEATURE:
<223> OTHER INFORMATION: oligonucleotide

<400> SEQUENCE: 35
gtttgcggac tgcacttcag                                              20

<210> SEQ ID NO 36
<211> LENGTH: 24
<212> TYPE: DNA
<213> ORGANISM: Artificial Sequence
<220> FEATURE:
<223> OTHER INFORMATION: oligonucleotide

<400> SEQUENCE: 36
aggattcacc tttaacatct tttt                                         24

<210> SEQ ID NO 37
<211> LENGTH: 28
<212> TYPE: DNA
<213> ORGANISM: Artificial Sequence
<220> FEATURE:
<223> OTHER INFORMATION: oligonucleotide

<400> SEQUENCE: 37
tgagaataat gttatcacta ttgatctg                                     28

<210> SEQ ID NO 38
<211> LENGTH: 26
```

```
<212> TYPE: DNA
<213> ORGANISM: Artificial Sequence
<220> FEATURE:
<223> OTHER INFORMATION: oligonucleotide

<400> SEQUENCE: 38
atttctgaaa tgtttttgca gattta                                              26

<210> SEQ ID NO 39
<211> LENGTH: 20
<212> TYPE: DNA
<213> ORGANISM: Artificial Sequence
<220> FEATURE:
<223> OTHER INFORMATION: oligonucleotide

<400> SEQUENCE: 39
tggcacatca ctcacgctga                                                     20

<210> SEQ ID NO 40
<211> LENGTH: 25
<212> TYPE: DNA
<213> ORGANISM: Artificial Sequence
<220> FEATURE:
<223> OTHER INFORMATION: oligonucleotide

<400> SEQUENCE: 40
attaagttca ggccaggatc tgtgg                                               25

<210> SEQ ID NO 41
<211> LENGTH: 19
<212> TYPE: DNA
<213> ORGANISM: Artificial Sequence
<220> FEATURE:
<223> OTHER INFORMATION: oligonucleotide

<400> SEQUENCE: 41
tctctgccca gaatccgac                                                      19

<210> SEQ ID NO 42
<211> LENGTH: 22
<212> TYPE: DNA
<213> ORGANISM: Artificial Sequence
<220> FEATURE:
<223> OTHER INFORMATION: oligonucleotide

<400> SEQUENCE: 42
ttgggtaaaa ctggaatgtc tt                                                  22

<210> SEQ ID NO 43
<211> LENGTH: 23
<212> TYPE: DNA
<213> ORGANISM: Artificial Sequence
<220> FEATURE:
<223> OTHER INFORMATION: oligonucleotide

<400> SEQUENCE: 43
tatccagcta ctggtcctgc tga                                                 23

<210> SEQ ID NO 44
<211> LENGTH: 18
<212> TYPE: DNA
<213> ORGANISM: Artificial Sequence
<220> FEATURE:
<223> OTHER INFORMATION: oligonucleotide

<400> SEQUENCE: 44
```

```
ccgtccatgc ggaagatc                                                    18

<210> SEQ ID NO 45
<211> LENGTH: 20
<212> TYPE: DNA
<213> ORGANISM: Artificial Sequence
<220> FEATURE:
<223> OTHER INFORMATION: oligonucleotide

<400> SEQUENCE: 45
gaagacctcc tcctcgcact                                                  20

<210> SEQ ID NO 46
<211> LENGTH: 24
<212> TYPE: DNA
<213> ORGANISM: Artificial Sequence
<220> FEATURE:
<223> OTHER INFORMATION: oligonucleotide

<400> SEQUENCE: 46
tctgttcctc gcagacctcc agca                                             24

<210> SEQ ID NO 47
<211> LENGTH: 18
<212> TYPE: DNA
<213> ORGANISM: Artificial Sequence
<220> FEATURE:
<223> OTHER INFORMATION: oligonucleotide

<400> SEQUENCE: 47
acagcccagg gaaacctc                                                    18

<210> SEQ ID NO 48
<211> LENGTH: 20
<212> TYPE: DNA
<213> ORGANISM: Artificial Sequence
<220> FEATURE:
<223> OTHER INFORMATION: oligonucleotide

<400> SEQUENCE: 48
ggatgggaac ggtgtagaga                                                  20

<210> SEQ ID NO 49
<211> LENGTH: 22
<212> TYPE: DNA
<213> ORGANISM: Artificial Sequence
<220> FEATURE:
<223> OTHER INFORMATION: oligonucleotide

<400> SEQUENCE: 49
tgatgacacc aatatcacac ga                                               22

<210> SEQ ID NO 50
<211> LENGTH: 22
<212> TYPE: DNA
<213> ORGANISM: Artificial Sequence
<220> FEATURE:
<223> OTHER INFORMATION: oligonucleotide

<400> SEQUENCE: 50
ggcttgtagg cctttactt cc                                                22

<210> SEQ ID NO 51
<211> LENGTH: 22
<212> TYPE: DNA
<213> ORGANISM: Artificial Sequence
```

<220> FEATURE:
<223> OTHER INFORMATION: oligonucleotide

<400> SEQUENCE: 51
ttcctgacct tggagcatct ca                                      22

<210> SEQ ID NO 52
<211> LENGTH: 19
<212> TYPE: DNA
<213> ORGANISM: Artificial Sequence
<220> FEATURE:
<223> OTHER INFORMATION: oligonucleotide

<400> SEQUENCE: 52
ggtccctgtg gatacactt                                          19

<210> SEQ ID NO 53
<211> LENGTH: 30
<212> TYPE: DNA
<213> ORGANISM: Artificial Sequence
<220> FEATURE:
<223> OTHER INFORMATION: oligonucleotide

<400> SEQUENCE: 53
aagtggctaa gggcatggag ttcttggcat                              30

<210> SEQ ID NO 54
<211> LENGTH: 17
<212> TYPE: DNA
<213> ORGANISM: Artificial Sequence
<220> FEATURE:
<223> OTHER INFORMATION: oligonucleotide

<400> SEQUENCE: 54
ggctctttct gtccggc                                            17

<210> SEQ ID NO 55
<211> LENGTH: 21
<212> TYPE: DNA
<213> ORGANISM: Artificial Sequence
<220> FEATURE:
<223> OTHER INFORMATION: oligonucleotide

<400> SEQUENCE: 55
ccacactctc ctatctttac t                                       21

<210> SEQ ID NO 56
<211> LENGTH: 30
<212> TYPE: DNA
<213> ORGANISM: Artificial Sequence
<220> FEATURE:
<223> OTHER INFORMATION: oligonucleotide

<400> SEQUENCE: 56
ttaccaagga gcttgaacat gccctggaga                              30

<210> SEQ ID NO 57
<211> LENGTH: 21
<212> TYPE: DNA
<213> ORGANISM: Artificial Sequence
<220> FEATURE:
<223> OTHER INFORMATION: oligonucleotide

<400> SEQUENCE: 57
ctttcctgtg aggcacgaag a                                       21

```
<210> SEQ ID NO 58
<211> LENGTH: 18
<212> TYPE: DNA
<213> ORGANISM: Artificial Sequence
<220> FEATURE:
<223> OTHER INFORMATION: oligonucleotide

<400> SEQUENCE: 58
gcagagttcc tctggggt                                              18

<210> SEQ ID NO 59
<211> LENGTH: 27
<212> TYPE: DNA
<213> ORGANISM: Artificial Sequence
<220> FEATURE:
<223> OTHER INFORMATION: oligonucleotide

<400> SEQUENCE: 59
cagaaggcag atgagggag gcacagg                                     27
```

STABILIZATION OF WHOLE BLOOD AT ROOM TEMPERATURE

CROSS REFERENCE TO RELATED APPLICATIONS

This application is a continuation of U.S. patent application Ser. No. 15/221,791 (published as US Publication No. 2016/0324144), filed Jul. 28, 2016, which is a continuation of International Patent Application No. PCT/EP2015/051658 filed Jan. 28, 2015, and claims priority to European Patent Application No. 14153199.6 filed Jan. 30, 2014, the disclosures of which are hereby incorporated by reference in their entirety.

BACKGROUND OF THE DISCLOSURE

The present disclosure pertains to compositions, uses, kits and methods useful in the stabilization of intact viable cells, particularly nucleated cells present in whole blood samples. The present disclosure is directed to the stabilization of nucleated cells in a whole blood sample ex-vivo, effected by an additive being a liquid composition for stabilizing an analyte in intact nucleated cells of a whole-blood sample ex-vivo, the composition being an aqueous solution, the solution comprising an anticoagulant, a phosphate salt, a cell-metabolizable sugar, adenine, and an antioxidant, wherein the antioxidant comprises a mitochondria-targeted antioxidant, preferably a mitochondria-targeted antioxidant selected from the group consisting of SkQ1, MitoQ, SS-31, and a mixture thereof. In a specific embodiment, the liquid composition further comprises a protease inhibitor. Further provided is advantageous use of the composition for stabilizing an analyte selected from DNA, RNA and protein in intact nucleated cells of the whole-blood sample ex-vivo, as well as kits including the composition for practicing said use. Additionally, specific methods are provided for stabilizing intact nucleated cells of a whole-blood sample ex-vivo.

Whole blood is one of the most frequently collected sample material for diagnostic analysis in medicine. However, sampling and analysis of whole blood are usually separate events. Following the sampling step, a major technical challenge exists concerning stabilization of intact cells, particularly intact nucleated cells, over a period of time. There is a specific desire in the art to preserve the biological status of nucleated cells in a whole blood sample, in order to bridge the time interval between sampling and analysis, see Olson W C et al. (Journal of Translational Medicine 9 (2011) 26), Tanner et al. (Clin. Lab. Haem. 24 (2002) 337-341), Baechler et al. (Genes and Immunity 5 (2004) 347-353), and Elliott et al. (International Journal of Epidemiology 37 (2008) 234-244). "Preservation of biological status" or "stabilization" is understood as providing conditions under which changes concerning the composition and levels of biomolecules present in a living cell at the time of sampling are minimized while keeping the cell intact and viable. Particular biomolecules of interest in this regard are DNA, RNA and protein.

Although some cell-preserving additives are known to the art, it still remains a technical challenge to stabilize a whole blood sample with nucleated cells over a period of 2 to 3 days at room temperature. There is a particular need for means enabling isolation of intact nucleated cells after that time interval, wherein the cells are preferably viable. More specifically, it is desired that any change of composition and level of biomolecules in the cells is minimized such that analysis of the cells after the time interval closely reflects the biological status of the cells at the time point when the whole blood was sampled.

BRIEF SUMMARY OF THE DISCLOSURE

A first aspect reported herein is a liquid composition for stabilizing an analyte in intact nucleated cells of a whole-blood sample ex-vivo, the composition being an aqueous solution, the solution comprising an anticoagulant, a phosphate salt, a cell-metabolizable sugar, adenine, and an antioxidant, wherein the antioxidant comprises a mitochondria-targeted antioxidant, preferably a mitochondria-targeted antioxidant selected from the group consisting of SkQ1, MitoQ, SS-31, and a mixture thereof.

A second aspect reported herein is the use of a composition as disclosed herein for stabilizing an analyte selected from DNA, RNA and protein in intact nucleated cells of a whole-blood sample ex-vivo.

A third aspect reported herein is a kit of parts comprising a blood drawing container enclosing a liquid composition according to the disclosure herein, the kit further comprising packaging material, a label, and a user instruction sheet.

A fourth aspect reported herein is method for stabilizing intact nucleated cells of a whole-blood sample ex-vivo, the method comprising the steps of (a) providing the whole blood sample ex-vivo; (b) contacting and mixing the sample of step (a) with a composition according to the disclosure herein; (c) incubating the mixture obtained in step (b), thereby stabilizing intact nucleated cells of the ex-vivo whole-blood sample.

Figure 1:
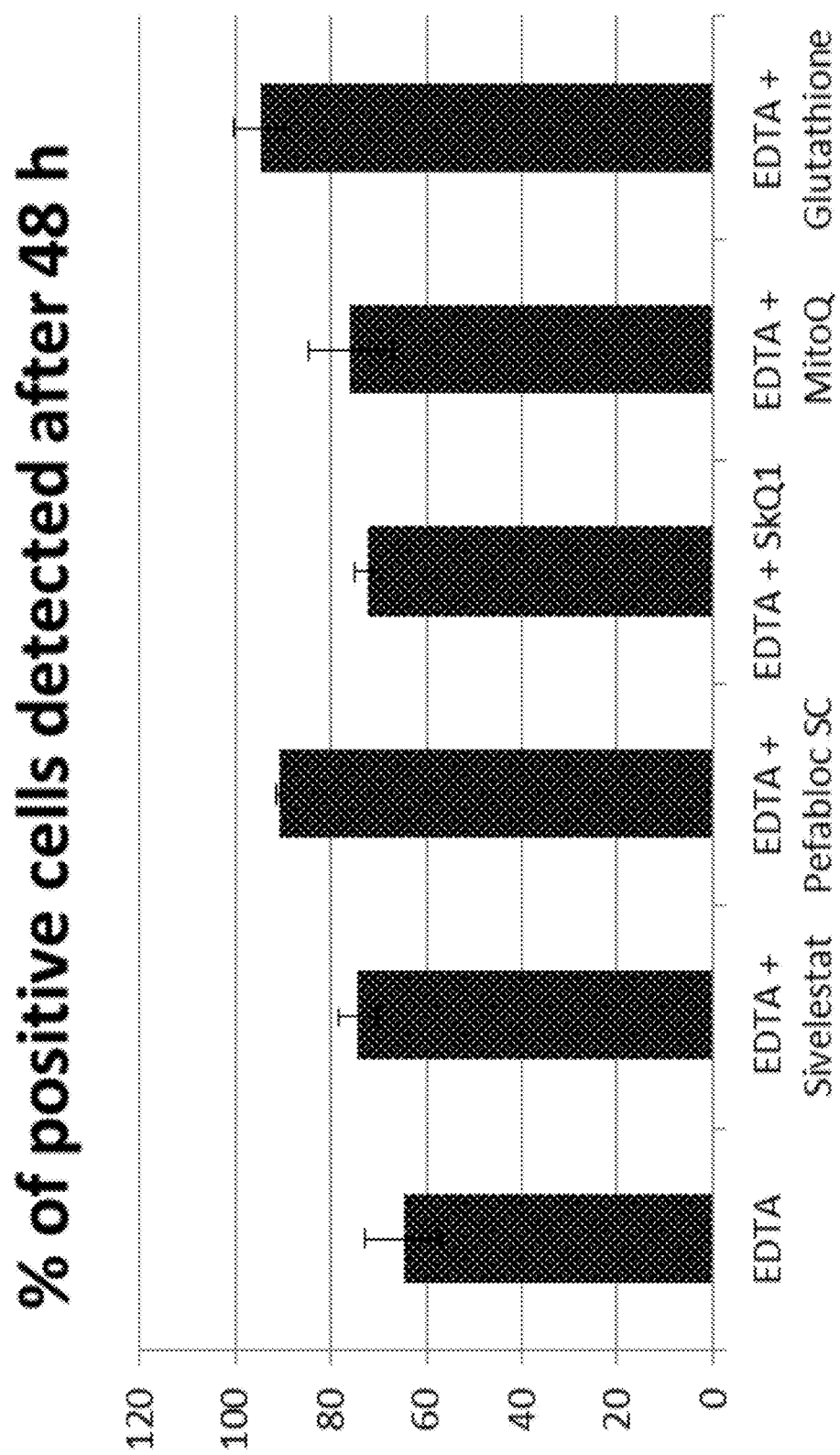
FIG. 1 Detection of MDA-MB-468 cells spiked into blood samples after storage for 48 hours at room temperature. Depicted is the percentage of MDA-MB-468 cells detected by immunostaining with Anti-CK5/8 antigens. "Box-and-whisker plot" indicating mean percentage of target cell retrieval by way of assay as described in Example 1. 1st diagrammed box—EDTA: MDA-MB-468 cells detected in blood sample stored in EDTA as anticoagulant. 2nd box—EDTA+ Sivelestat: MDA-MB-468 cells detected in blood sample stored in EDTA as anticoagulant and sivelestat as stabilizer. 3rd box—EDTA+Pefabloc® SC: MDA-MB-468 cells detected in blood sample stored in EDTA as anticoagulant and Pefabloc® SC as stabilizer. 4th box—EDTA+SKQ1: MDA-MB-468 cells detected in blood sample stored in EDTA as anticoagulant and SKQ1 as stabilizer. 5th box—EDTA+MitoQ: MDA-MB-468 cells detected in blood sample stored in EDTA as anticoagulant and MitoQ as stabilizer. 6th box—EDTA+glutathione: MDA-MB-468 cells detected in blood sample stored in EDTA as anticoagulant and glutathione as stabilizer.

Open diamond: specimen 1, EDTA-stabilized, closed diamond: specimen 1 with Stabilizer 5.
Open square: specimen 2, EDTA-stabilized, closed square: specimen 2 with Stabilizer 5.
Open circle: specimen 1, EDTA-stabilized, closed circle: specimen 1 with Stabilizer 5.
Open triangle: specimen 2, EDTA-stabilized, closed triangle: specimen 2 with Stabilizer 5.

DETAILED DESCRIPTION

For the purpose of the present disclosure, certain terms are defined as follows herein. In the event of a conflict in a definition in the present disclosure and that of a cited reference, the present disclosure controls.

As used herein, the term "comprising" means that other steps and other components that do not affect the end result may be utilized. The term "comprising" encompasses the expressions "consisting of," and "consisting, essentially of". The use of singular identifiers such as "the," "a," or "an" is not intended to be limiting solely to the use of a single component, but may include multiple components. For example, unless stated otherwise the expression "a compound" has the meaning of "one or more compound(s)". As used herein, "plurality" is understood to mean more than one. For example, a plurality refers to at least two, three, four, five, or more.

Unless specifically stated or obvious from context, as used herein, the term "or" is understood to be inclusive. The term "and/or" means one or all of the listed elements or a combination of any two or more of the listed elements. Ranges are used herein as a shorthand for describing each and every value that is within the range (e.g., 1 to 5 includes 1, 1.5, 2, 2.75, 3, 3.80, 4, 5, etc.). Any value within the range can be selected as the terminus of the range. Unless specifically stated or obvious from context, as used herein, the term "about" is understood as within a range of normal tolerance in the art, for example within 2 standard deviations of the mean. If not indicated differently, "about" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term "about".

As used herein the term "room temperature", unless specified otherwise, means the ambient temperature of a typical laboratory, which is usually about 18° C. to 25° C. In a specific embodiment, room temperature is a temperature selected from the group consisting of 18° C., 19° C., 20° C., 21° C., 22° C., 23° C., 24° C., and 25° C. As used herein, a "purified" or "isolated" compound means the compound has been separated from the mixture in which it was formed. With respect to cells, a "purified" or "isolated" cell denotes one or more cells or a group of cells that were enriched or separated from a mixture of cells. By way of non-limiting example, nucleated cells can be isolated from the mixture of cells in an ex vivo sample of whole blood by lysing the erythrocytes present in the sample and separating by centrifugation intact nucleated cells, discarding the supernatant and re-suspending the pelleted cells in a physiological buffer or in a cell culture medium.

Disclosed herein is a "composition", the term being understood as signifiying the product of combining and mixing a plurality of ingredients. A "liquid" composition is a composition which is present in the liquid state of aggregation. Specifically, the liquid composition as disclosed herein is an aqueous composition, a solution with water as solvent and a plurality of water-soluble compounds dissolved therein. An "analyte" in general is a substance, specifically a cellular component, which is the target of an analytical process such as, but not limited to, a process for qualitative or quantitative detection of the substance. A specific analyte for the purpose of the present disclosure is selected from DNA, RNA and protein, the latter comprising oligopeptides, polypeptides, and posttranslational modified derivatives thereof.

A large number of processes are known for purifying and analyzing nucleic acids. In the analytical field, specific focus is on qualitative and/or quantitative detection of specific DNA or RNA sequences. Using the polymerase chain reaction (PCR) and specific primers hybridizing to the flanks of a DNA sequence of interest, said sequence can be amplified, and the amplified sequence can be detected. Such detection usually is performed as a hybridization reaction with a labeled probe. So-called real-time PCR allows this detection step to take place while the target sequence is being amplified. For the specific detection of a RNA sequence, RNA needs to be reverse-translated to form cDNA; the cDNA reflecting the target RNA sequence can then be amplified and detected using a PCR-based DNA amplification technique.

Specific detection of a target protein is typically achieved making use of specific binders capable of binding to the target. Thus, immunoassay detection methods are a non limiting example of this approach.

The present disclosure is specifically directed to stabilizing an analyte selected from DNA, RNA and protein in intact nucleated cells of a whole-blood sample ex-vivo for a period of up to 72 hours (0 to 72 h), specifically 48 to 72 hours, the period counted from the time point of sampling the whole blood and contacting the whole blood with the stabilizing composition as disclosed herein. Advantageously, the time between blood sampling and contacting the blood with the stabilizing composition is less than 30 seconds.

The term "stabilizing" includes the specific meaning of keeping intact the cell membranes of nucleated cells of the blood sample, and preserving and maintaining in the nucleated cells the cellular proteins and the cellular DNA as well as the cellular RNA and particularly the composition of cellular mRNA reflecting the gene expression status at the time of sampling; in addition, "stabilizing" encompasses providing an environment in which nucleated cells have a substantially reduced tendency to undergo necrosis or apoptosis, and in which the pattern of expressed proteins remains largely unchanged. The term "stabilizing" further includes supporting of vital cell functions, avoiding intoxication of cells and cell death, maintaining the nucleated cells in a resting but viable state.

Unless explicitly mentioned otherwise, the expression "citrate/citric acid" refers to a mixture of trisodium citrate and citric acid. Reference to Blood with EDTA as the sole anticoagulant means whole blood having an EDTA concentration of about 1.8 mg per ml of blood.

A first aspect as disclosed herein is a liquid composition for stabilizing an analyte in intact nucleated cells of a whole-blood sample ex-vivo, the composition being an aqueous solution, the solution comprising an anticoagulant, a phosphate salt, a cell-metabolizable sugar, adenine, and an antioxidant, wherein the antioxidant comprises a mitochondria-targeted antioxidant, preferably a mitochondria-targeted antioxidant selected from the group consisting of SkQ1, MitoQ, SS-31, and a mixture thereof. Specifically, the analyte is selected from DNA, RNA and protein of intact nucleated cells of the whole-blood sample.

The term "whole blood" in all aspects and embodiments disclosed herein denotes blood that was directly collected from a vertebrate, specifically from a mammal, more specifically from a primate, even more specifically from a human, without any further treatment other than the blood drawing process. It is understood that the blood drawing process itself is not part of any of the procedures, uses and/or methods according to the present disclosure. Rather, the present disclosure relates to procedures, uses and methods based on the provision of a sample of whole blood "ex-vivo", that is to say whole blood outside of and separate from the organism from which it was drawn. The whole blood ex vivo is provided as a "sample", being understood as a measured amount of whole blood.

Additives that inhibit blood and/or plasma from clotting are important for ensuring that the cells to be analyzed are not negatively affected by blood coagulation prior to the analytical process. Anticoagulation occurs by binding calcium ions (EDTA, citrate) or by inhibiting thrombin activity (heparin, hirudin). Therefore, in order to prevent blood clotting of the ex-vivo whole blood sample, the composition as disclosed in all aspects and embodiments herein comprises an anticoagulant, specifically an anticoagulant selected from the group consisting of EDTA, citrate, heparin, hirudin, warfarin, and a mixture thereof. Anticoagulant additives which at the same time permit integrity, that is to say the absence of lysis and the viability of nucleated cells are known to the art. In a specific embodiment in all aspects as disclosed herein, sodium citrate/citric acid is added to the whole blood sample to a final concentration of 11.7 mM and 2.1 mM, respectively.

The phosphate salt in the composition as disclosed in here, either alone or in combination with EDTA and/or citrate, if present, effects the buffering of the whole blood sample at a physiological pH. In a specific embodiment of all aspects as disclosed herein, the phosphate salt is $NaH_2PO_4$, added to the whole blood sample to a final concentration of 2.1 mM in an even more specific embodiment. Further additives are adenine and a cell-metabolizable sugar, in order to support cell integrity and viability. In a further specific embodiment of all aspects as disclosed herein, adenine is added to the whole blood sample to a final concentration of 0.24 mM.

Notably, is was found by the authors of the present disclosure that the presence of an effective amount of an antioxidant is essential, in order to stabilize nucleated cells of a whole blood sample ex-vivo. The observed beneficial effects of antioxidants point to reactive oxygen species as a possible cause for cell instability in the sample. Reactive oxygen species are typically generated by NADPH oxidase, xanthine oxidase, the mitochondrial electron-transport chain, and dysfunctional endothelial nitric oxide synthase. When the capacity of cellular antioxidant defense systems, e.g., superoxide dismutase, catalase, glutathione peroxidase, heme oxygenase, paraoxonase, is exceeded, this results in oxidative stress, which can promote cell death. Therefore, means to prevent oxidative stress are of major interest.

Particularly, mitochondria produce substantial amounts of $O_2^-$ at the mitochondrial electron-transport chain complexes I and III. Complex I releases $O_2^-$ into the mitochondrial matrix and is considered the main producer of $O_2^-$ due to reverse electron flow from complex II under low-ADP conditions. The matrix-localized mitochondrial superoxide dismutase 2 (SOD2) dismutates $O_2^-$ to $H_2O_2$, which in turn is reduced to water by glutathione peroxidase or catalase. The importance of SOD2 thus lies in the detoxification of $O_2^-$ to prevent generation of $ONOO^-$ (peroxynitrite) and/or oxidative damage of mitochondrial electron-transport chain proteins and mitochondrial DNA, which may otherwise compromise mitochondrial function. Complex III also releases $O_2^-$ to the mitochondrial intermembrane space, where it is dismutated by SOD1, another isozyme of superoxide dismutase. Mitochondria themselves are known to be sensitive to reactive oxygen species. Oxidative damage lowers their activity and may even increase their production of reactive oxygen species. Enhanced levels thereof are known to damage the mitochondrial DNA and to stimulate the release of mitochondrial apoptotic factors.

Importantly, the composition in all aspects and embodiments as disclosed in here comprises a mitochondria-targeted antioxidant. An "antioxidant" in a generic sense is a molecule that is capable of inhibiting oxidation or reactions promoted by oxygen, reactive oxygen species, and peroxides. This includes the property of being capable of inhibiting and/or terminating a reaction of a free radical. An antioxidant is typically a reducing agent which is capable of taking part in oxidation reactions as an electron donor, thus becoming oxidized itself. An antioxidant according to the understanding as disclosed in here acts as a substitute oxidation target competing with cellular components which in the absence of the antioxidant would be oxidized and thereby compromised by oxidative damage.

A "mitochondria-targeted" antioxidant is an antioxidant which is typically applied extracellularly, which is capable of crossing the cellular membrane and capable of interacting with the mitochondrial membrane, in order to inhibit certain oxidation processes taking place in the mitochondrial compartment of the cell. Specific examples for such cell-permeable antioxidants are SkQ1, MitoQ, SS-31, among others. SkQ1, also known as a salt comprising 10-(6'-plastoquinonyl) decyltriphenylphosphonium, is known for its neuroprotective properties, among others. When applied to target cells extracellularly, SkQ1 has been shown to inhibit oxidative stress caused by reactive oxygen species in mitochondria. MitoQ is a mixture of mitoquinol (reduced form) and mitoquinone (oxidized form), also known as (10-(2,5-dihydroxy-3,4-dimethoxy-6-methylphenyl)decyl) triphenylphosphonium and (10-(4,5-dimethoxy-2-methyl-3,6-dioxocyclohexa-1,4-dienyl)decyl) triphenylphosphonium. MitoQ comprises a ubiquinol moiety which is covalently attached through an aliphatic carbon chain to a lipophilic triphenylphosphonium cation. The antioxidant reactions of extracellularly applied MitoQ predominantly occur within phospholipid bilayers. SS-31 (d-Arg-Dmt-Lys-Phe-NH2; Dt=2',6'-dimethyltyrosine) is a member of a family of several cell-permeable antioxidant peptides that reduce intracellular free radicals. Like other members in the family, SS-31 peptides are known to target mitochondria and protect mitochondria against mitochondrial permeability transition, swelling, and cytochrome c release, and prevent t-butylhydroperoxide-induced apoptosis.

Various concentrations of mitochondria-targeted antioxidants are useful in the present invention. Exemplary concentrations include an aggregate concentration of 10 nM to 200 µM. Still future exemplary concentrations are in the range of 50 nM-250 nM.

A number of other mitochondria targeted antioxidants are known to the art, particularly from clinical applications in the fields of cardiovascular and neurodegenerative diseases. In principle, these also qualify as compounds which can be advantageously used as alternative stabilizing compounds, in order to practice the teachings of the present disclosure.

In a specific embodiment of all aspects as disclosed herein, the mitochondria targeted antioxidant is SkQ1. In an even more specific embodiment, SkQ1 is added to the whole blood sample to a final concentration of 5-500 nM, advantageously to a final concentration of 50-250 nM, particularly about 100 nM. In yet a further specific embodiment of all aspects as disclosed herein, the mitochondria targeted antioxidant is SS-31. In an even more specific embodiment, SS-31 is added to the whole blood sample to a final concentration of 0.1-50 µM, advantageously to a final concentration of 0.5-10 µM, particularly about 1 µM.

As the antioxidants disclosed in here are applied in an aqueous solution, the antioxidants selected to practice all aspects and embodiments of the present disclosure are advantageously water soluble or solubilized in water, e.g. using a helper substance including, but not limited to a surfactant, a detergent and an emulsifier.

In a specific embodiment of all aspects as disclosed herein, the antioxidant is a mixture of a first and a second antioxidant, wherein the first antioxidant is a mitochondria-targeted antioxidant, and the second antioxidant is an antioxidant other than a mitochondria-targeted antioxidant. This group encompasses water-soluble molecules with a reducing activity, wherein the molecules are capable of undergoing oxidation outside of the mitochondrial compartment. The second antioxidant, in a further specific embodiment, is an antioxidant other than SkQ1, MitoQ, and SS-31. Advantageously, in an even more specific embodiment of all aspects as disclosed herein, the second antioxidant is selected from the group consisting of glutathione, acetylsalicylic acid, N-acetyl-5-aminosalicylic acid, N-acetylcysteine, 6-hydroxy-2,5,7,8-tetramethylchroman-2-carboxylic acid (Trolox) and a mixture thereof.

Further stabilization of nucleated cells of the whole blood sample is provided by the presence of a protease inhibitor in the liquid composition in all aspects and embodiments as disclosed herein. A specific embodiment in this regard includes an inhibitor of a serine protease. A more specific embodiment in this regard includes an inhibitor of human neutrophil elastase. Particular advantage is provided by specific embodiments of a liquid composition for stabilizing an analyte in intact nucleated cells of a whole-blood sample ex-vivo, the liquid composition including a protease inhibitor selected from Sivelestat, AEBSF, and a mixture thereof. The compound commercialized as "Sivelestat" or "ONO-5046", also known as N-{2-[({4-[2,2-dimethylpropanoyl)oxy]phenyl}sulfonyl)amino]benzoyl}glycine is a selective neutrophil elastase inhibitor. AEBSF is an abbreviation of 4-(2-Aminoethyl)benzenesulfonyl fluoride which a water soluble, and which is an irreversible serine protease inhibitor. The hydrochloride is commercially available as Pefabloc® SC. In a specific embodiment of all aspects as disclosed herein, and with particular advantage, Pefabloc® SC is added to the whole blood sample to result in a final concentration of 0.05-1 mM, more specifically 0.1-0.5 mM, and even more specifically 0.2-0.3 mM, particularly about 0.25 mM.

Pefabloc® SC is a water-soluble serine protease inhibitor with a molecular weight of 239.5 Daltons, also known to the art as 4-(2-aminoethyl) benzenesulfonyl fluoride hydrochloride (AEBSF). The compound is capable of inhibiting proteases like chymotrypsin, kallikrein, plasmin, thrombin, and trypsin.

In order to stabilize the nucleated cells of the whole blood sample, it was also found to be of advantage to supplement the sample with a cell-metabolizable sugar. In a specific embodiment of all aspects as disclosed herein, the sugar is selected from glucose and fructose. In an even more specific embodiment, the glucose is added to the whole blood sample to a final concentration of 15-25 mM, advantageously to a final concentration of 19-21 mM, particularly about 20 mM.

A further aspect as disclosed in here is a kit of parts comprising a liquid composition for stabilizing an analyte in intact nucleated cells of a whole-blood sample ex-vivo as disclosed in here, the composition being an aqueous solution, the solution comprising an anticoagulant, a phosphate salt, a cell-metabolizable sugar, adenine, and an antioxidant, wherein the antioxidant comprises a mitochondria-targeted antioxidant, the liquid composition being enclosed in a blood drawing container, the kit further comprising packaging material, a label, and a user instruction sheet.

In one embodiment, the composition of the present invention comprises 11.1 mM-12.3 mM trisodium citrate, 2 mM-2.2 mM citric acid, 2 mM-2.2 mM NaH$_2$PO$_4$, 19.1 mM-21.1 mM glucose, 0.23 mM-0.25 mM adenine, 0.24 mM-026 mM AEBSF, 990 nM-1.1 µM SS-31 and acetylsalicylic acid 990 µM-1.1 mM.

The liquid composition for stabilizing an analyte in intact nucleated cells of a whole-blood sample ex-vivo in all aspects and embodiments as disclosed in here is advantageously contained in a blood drawing container. An example therefor is known to the art as a "vacutainer". A vacutainer is a blood collection tube provided as a sterile glass or plastic tube with a closure and a vacuum inside the tube facilitating the draw of a predetermined volume of liquid such as a whole blood sample from the vein of a subject. A vacutainer tube according to the present disclosure contains a liquid composition for stabilizing an analyte in intact nucleated cells of a whole-blood sample ex-vivo, in order to stabilize and preserve the whole blood sample prior to analytical testing. Tubes are available with or without a safety-engineered closure, with a variety of labeling options and closure colors as well as a range of draw volumes.

In the blood collection process, the vein is first punctured with a hypodermic needle which is carried in a translucent plastic holder. The needle is double ended, the second shorter needle being shrouded for safety by the holder. When a Vacutainer test tube is pushed down into the holder, its rubber cap is pierced by the second needle and the pressure difference between the blood volume and the vacuum in the tube forces blood through the needle and into the tube. The filled tube is then removed and another can be inserted and filled the same way. It is important to remove the tube before withdrawing the needle, as there may still be some suction left, causing pain upon withdrawal. Once the collection tube is removed from the needle, the whole blood sample inside the tube is detached from the body of the subject, hence being an ex-vivo whole blood sample. Thus, another specific embodiment of all aspects as disclosed herein is enclosing a mixture of (a) a liquid composition for stabilizing an analyte in intact nucleated cells of a whole-blood sample ex-vivo as disclosed herein, and (b) an amount of whole blood, i.e. the sample being a measured and/or predetermined amount of whole blood ex-vivo.

Another aspect disclosed in here is the use of a liquid composition for stabilizing an analyte in intact nucleated cells of a whole-blood sample ex-vivo as disclosed in here, the composition being an aqueous solution, the solution comprising an anticoagulant, a phosphate salt, a cell-metabolizable sugar, adenine, and an antioxidant, wherein the antioxidant comprises a mitochondria-targeted antioxidant, the use being for the purpose of stabilizing an analyte selected from DNA, RNA and protein in intact nucleated cells of a whole-blood sample ex-vivo.

Thus, another aspect disclosed in here is a method for stabilizing intact nucleated cells of a whole-blood sample ex-vivo, the method comprising the steps of (a) providing the whole blood sample ex-vivo; (b) contacting and mixing the sample of step (a) with a liquid composition for stabilizing an analyte in intact nucleated cells of a whole-blood sample ex-vivo as disclosed in here, the composition being an aqueous solution, the solution comprising an anticoagulant, a phosphate salt, a cell-metabolizable sugar, adenine, and an antioxidant, wherein the antioxidant comprises a mitochondria-targeted antioxidant; (c) incubating the mixture obtained in step (b), thereby stabilizing intact nucleated cells of the ex-vivo whole-blood sample. In a specific embodiment of all aspects as disclosed in here, the whole blood sample contacted and mixed with the liquid composition as disclosed in here can be incubated at room temperature for a prolonged time interval, whereby the nucleated cells present in the whole blood sample are stabilized, as well as analytes in the cells, particularly DNA, RNA, and protein. In a specific embodiment, the step of incubating the mixture obtained in step (b) can be performed at room temperature for a time interval selected from the group consisting of 0 h-12 h, 0 h-24 h, 0 h-36 h, 0 h-48 h, 0 h-60 h, and 0 h-72 h, or even for longer, depending on the analyte to be detected thereafter.

In the embodiments of all aspects as disclosed herein, the target cell for stabilization is a nucleated cell present in the ex-vivo sample of whole blood. Specifically, the nucleated cell is a nucleated cell of hematopoetic lineage or a nucleated cell of non-hematopoetic lineage. Specifically, a nucleated cell of hematopoetic lineage is selected from the group of cell types consisting of a megakaryocyte, a thrombocyte, a nucleated red blood cell, a mast cell, a myeloblast, a basophil, a neutrophil, an eosinophil, a monocyte, a macrophage, a large granular lymphocyte, a small lymphocyte, a T lymphocyte, a B lymphocyte, a plasma cell, and a dendritic cell, or a precursor of any of the said cell types. In another specific embodiment, the nucleated cell is a nucleated cancer cell of hematopoetic lineage.

In a further embodiment of all aspects as disclosed herein, the target cell for stabilization is a nucleated cell present in the ex-vivo sample of whole blood, the nucleated cell being capable of undergoing two or more cell divisions thereby forming daughter cells. In a specific embodiment, the nucleated cell is capable of undergoing cell divisions not only in vivo but also ex-vivo in a culture medium. Thus, the present disclosure, its aspects and embodiments provide liquid compositions for supporting and/or maintaining the viability of an intact nucleated target cell of a whole-blood sample ex-vivo, the composition being an aqueous solution, the solution comprising an anticoagulant, a phosphate salt, a cell-metabolizable sugar, adenine, and an antioxidant, wherein the antioxidant comprises a mitochondria-targeted antioxidant, preferably a mitochondria-targeted antioxidant selected from the group consisting of SkQ1, MitoQ, SS-31, and a mixture thereof, wherein the intact nucleated target cell is capable of undergoing one or more cell divisions. More specifically, the nucleated target cell is capable of undergoing one or more cell divisions in a culture medium.

In this regard, the skilled person is well aware of different culture media which support viability and cell division of mammalian cells, specifically of human cells, more specifically of cancer cells of human origin. In a specific embodiment the culture media support cell viability and cell division in the absence of a composition for supporting and/or maintaining the viability of an intact nucleated target cell in an ex-vivo of whole-blood as disclosed in the present document.

On the one hand, despite being in a resting state the viability of the nucleated target cell is maintained in the ex-vivo whole-blood sample that is mixed with the stabilizing liquid composition as disclosed. On the other hand and remarkably, the nucleated target cell which is in a resting state can be isolated from the stabilized blood sample and be put into culture, whereby once removed from the stabilizers the nucleated cell becomes physiologically active again. In other words, upon removing the nucleated target cell from the whole-blood sample with the stabilizing composition the resting state is reversed, even including the biological functions necessary for cell division. Thus, the skilled person is now equipped with improved means to isolate a nucleated target cell from a sample of whole blood, wherein in a specific embodiment the target cell is capable of undergoing cell divisions ex vivo, and more specifically wherein the target cell is a cancer cell, e.g. but not limited to, a circulating tumor cell.

Yet, in a further embodiment of all aspects as disclosed herein there is provided a method to isolate and culture a nucleated target cell present in an ex-vivo sample of whole blood, comprising the steps of (a) providing the ex-vivo whole blood sample; (b) contacting and mixing the sample of step (a) with a liquid composition, the composition being an aqueous solution, the solution comprising an anticoagulant, a phosphate salt, a cell-metabolizable sugar, adenine, and an antioxidant, wherein the antioxidant comprises a mitochondria-targeted antioxidant, preferably a mitochondria-targeted antioxidant selected from the group consisting of SkQ1, MitoQ, SS-31, and a mixture thereof; (c) incubating the mixture obtained in step (b), thereby stabilizing intact nucleated cells of the ex-vivo whole-blood sample; separating nucleated cells from the incubated mixture of step (c) and contacting the separated nucleated cells with a culture medium; and (d) incubating the nucleated cells in the culture medium. In specific embodiments the liquid composition is selected from a liquid composition for stabilizing an analyte in intact nucleated cells of a whole-blood sample ex-vivo as disclosed herein in any aspects and embodiments.

A cancer with metastatic tumors spread over the human body is more difficult to remove or treat than a cancer with a primary tumor. In a patient with metastatic disease, circulating tumor cells (CTCs) can be found in venous blood. These circulating tumor cells are potential seeds for metastatic cancer growth. To detect these cells is a particular desire in cancer care. Thus, the teaching, aspects and embodiments disclosed herein provide additional means for this purpose.

Accordingly, in yet further embodiments of all aspects as disclosed herein, the target cell for stabilization is a nucleated cancer cell present in the ex-vivo sample of whole blood. Specifically, the target cell for stabilization is a nucleated cell present in the ex-vivo sample of whole blood, wherein the individual from whom the sample of whole blood is obtained prior to stabilization (and detection) suffers from a cancer. In a specific embodiment, the target cell is a nucleated cell of non-hematopoetic lineage, particularly a cancer cell of non-hematopoetic lineage. Particularly, the cancer cell is a circulating tumor cell, specifically a cell shedded from a solid tumor into the circulation, the circulation including lymph and blood.

In a specific embodiment of all aspects as disclosed herein, the circulating tumor cell is selected from a solid tumor of cells selected from the group consisting of epithelial, connective tissue, bone, cartilage, muscle, and nerve cells. Circulating tumor cells are specific nucleated cells the present disclosure as presented here aims to make detectable in whole blood, by stabilizing the cancer cells in the whole blood over a period of time, preferably at room temperature.

The following examples, figures, and the sequence listing are provided to aid the understanding of the present invention, the true scope of which is set forth in the appended claims. It is understood that modifications can be made in the procedures set forth without departing from the spirit of the disclosures and teachings as provided herein.

Example 1

Preservation of Cellular Proteins

Suspended cells of MDA-MB-468, a human breast cancer cell line were spiked into blood samples obtained from healthy individuals to result in 100,000 spiked cells per ml blood. The samples were processed either immediately or after storage at room temperature for 48 hours. Sample 1 contained EDTA as anticoagulant only and no additive, sample 2 to 6 were supplemented with Sivelestat (10 µg/ml), Pefabloc® SC (1 mM), SkQ1 (100 nM), Mito Q (100 nM) and glutathione (3 mM), respectively.

Nucleated cells were enriched by erythrocytes lysis. A 50 µl aliquot of peach sample was mixed with 200 µl of lysis buffer (100 mM $NH_4Cl$, 5 mM Hepes, 0.5 mM $KHCO_3$, 0.1 mM EDTA) and incubated for 10 min at room temperature. After centrifugation at 200×g for 15 min, the supernatant was removed and the pellet was resuspended in 250 µl of lysis buffer. After centrifugation at 200×g for 15 min, the supernatant was removed and the pellet was resuspended in 1,000 µl of PBS, 0.3 mM EDTA. The cells were sedimented by centrifugation at 200×g for 15 min. The pellet was resuspended in PBS, 0.3 mM EDTA and the volume of the samples adjusted to 500 µl.

For each sample a volume of 50 µl of the cell suspension was spotted on a glass slide and air-dried. The slides were fixed in ice cold acetone for 10 min, washed with PBS twice and immersed in labeling mixture containing anti-cytokeratine K5/K8-FITC labeled antibody diluted 1:50 in PBS (cytokeratine=CK). After an incubation for 30 min in the dark the supernatant was removed. DAPI-containing mounting medium was added, the spots covered with cover slips and after a further incubation for 20 min analyzed on a Zeiss Axio Observer Microscope. The total number of nucleated cells and the CK 5/8 positive cells were analyzed with the Assay Builder Software from Zeiss. The result is shown in FIG. 1. The samples containing protease inhibitors like Sivelestat (inhibitor of neutrophilic elastase) and Pefabloc SC (serine protease inhibitor) showed higher signals than the control sample without additive. Particular positive effects were observed with SkQ1 and MitoQ, antioxidants targeted to mitochondria. A further positive effect was observed with the antioxidant glutathione.

FIG. 1 illustrates the detection of MDA-MB-468 cells spiked into blood samples after storage for 48 hours at room temperature. Depicted is the percentage of MDA-MB-468 cells detected by immunostaining with Anti-CK 5/8 antigens.

Example 2

Preservation of Cellular Proteins

MDA-MB-468 cells were spiked into blood samples obtained from healthy individuals to result in a concentration of 100,000 spiked cells/ml blood. The samples were processed either immediately or after storage at room temperature for 48 hours. Sample 1 contained EDTA as sole anticoagulant and no further additive, samples 2 to 4 contained citrate (11.7 mM)/citric acid (2.1 mM), $NaH_2PO_4$ (2.1 mM), Dextrose (20.1 mM; Dextrose=D-glucose), Adenine (0.24 mM) as stabilizer. Sample 3 was additionally supplemented with the mitochondria targeted antioxidant SS-31 (1 µM), sample 4 with glutathione (0.75 mM). Nucleated cells were enriched by erythrocytes lysis and processed as described in Example 1.

Figure 2:
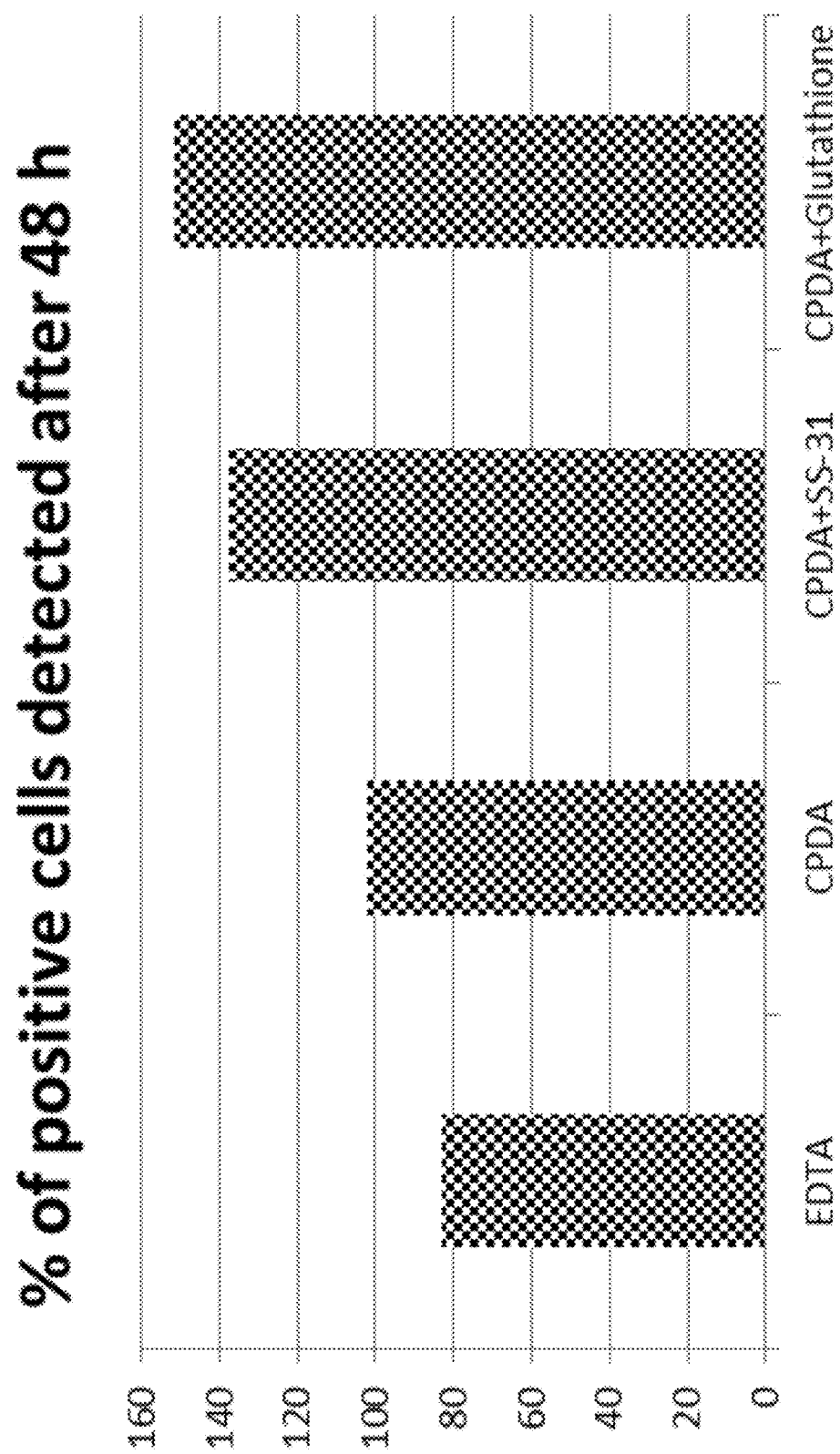
FIG. 2 Detection of MDA-MB-468 cells spiked into blood samples after storage for 48 hours at room temperature. Depicted is the percentage of MDA-MB-468 cells detected by immunodetection with fluorescent anti-CK 5/8 antibodies. "Box plot" indicating mean percentage of target cell retrieval by way of the assay described in Example 2. 1st diagrammed box—EDTA: MDA-MB-468 cells detected in blood sample stored in EDTA as anticoagulant. 2nd box—CPDA: MDA-MB-468 cells detected in blood sample stored in citrate/citric acid, phosphate, dextrose and adenine. 3rd box—CPDA+SS-31: MDA-MB-468 cells detected in blood sample stored in citrate, phosphate, dextrose, adenine and SS+31. 4th box—CPDA+glutathione: MDA-MB-468 cells detected in blood sample stored in citrate, phosphate, dextrose, adenine and glutathione.

The result is shown in FIG. 2. Further to the results of Example 1, antioxidants also showed their positive effect in citrate anticoagulated blood. FIG. 2 illustrates the detection of MDA-MB-468 cells spiked into blood samples after storage for 48 hours at room temperature. Depicted is the percentage of MDA-MB-468 cells detected by immunodetection with fluorescent Anti-CK5/8 antibodies.

Example 3

Preservation of DNA

Blood samples from 3 healthy individuals in EDTA or EDTA mixed with glutatione (325 mM), SKQ1 (100 µM), and Pefabloc®SC (100 mM), also referred to as "Stabilizer 3", were spiked with Karpas 422 cells in final concentrations of 200,000 spiked cells per ml blood. The samples were stored at ambient temperature. Karpas cells are a B-cell non-Hodgkin's lymphoma (NHL) cell line bearing both t(14;18) and t(4;11) chromosomal translocations. The t(14; 18) translocation was selected as a marker to distinguish the DNA originating from Karpas cells from the DNA originating from normal, i.e. t(14;18) translocation-free blood cells.

Immediately after sample set up and following an incubation at room temperature for 48 hours, nucleated cells were enriched by erythrocyte lysis. Aliquots of 350 µl sample were mixed with 1,000 µl of lysis buffer (80 mM $NH_4Cl$, 10 mM Hepes buffer, 0.1 mM EDTA) and incubated for 10 min at room temperature. After centrifugation at 300×g for 15 min, the supernatant was removed and the pellet was resuspended in 1,000 µl of lysis buffer. After centrifugation at 300×g for 15 min, the supernatant was removed and the pellet was resuspended in 1,000 µl of PBS. The cells were sedimented by centrifugation at 300×g for 15 min. The pellet was resuspended in PBS and the DNA isolated with High Pure Template Preparation Kit (Roche Applied Science, Cat. 11 796 828 001) according to the protocol recommended by the manufacturer. The DNA was eluted with 100 µl elution buffer from the HighPure columns.

Aliquots of 5 µl DNA from each sample were used in 20 µl PCR reactions, in triplicates. Amplification was performed with Lightcycler 480 Probes Master (Roche Applied Science Cat. No. 04707494001) in a LightCycler 480 instrument with an initial denaturation at 95° C. for 10 min, 50 cycles with 95° C. for 10 sec, 60° C. for 60 sec. The primer and probe sequences used were: t(14/18) forward primer acctgaggagacggtgac (SEQ ID NO:1); t(14/18) reverse primer tggggttttgaccttagaga (SEQ ID NO:2); t(14/18)-FAM detection probe 6FAM-ctctgggtgggtctgtgttgaaaca-BHQ2 (sequence is SEQ ID NO:3).

Figure 3:
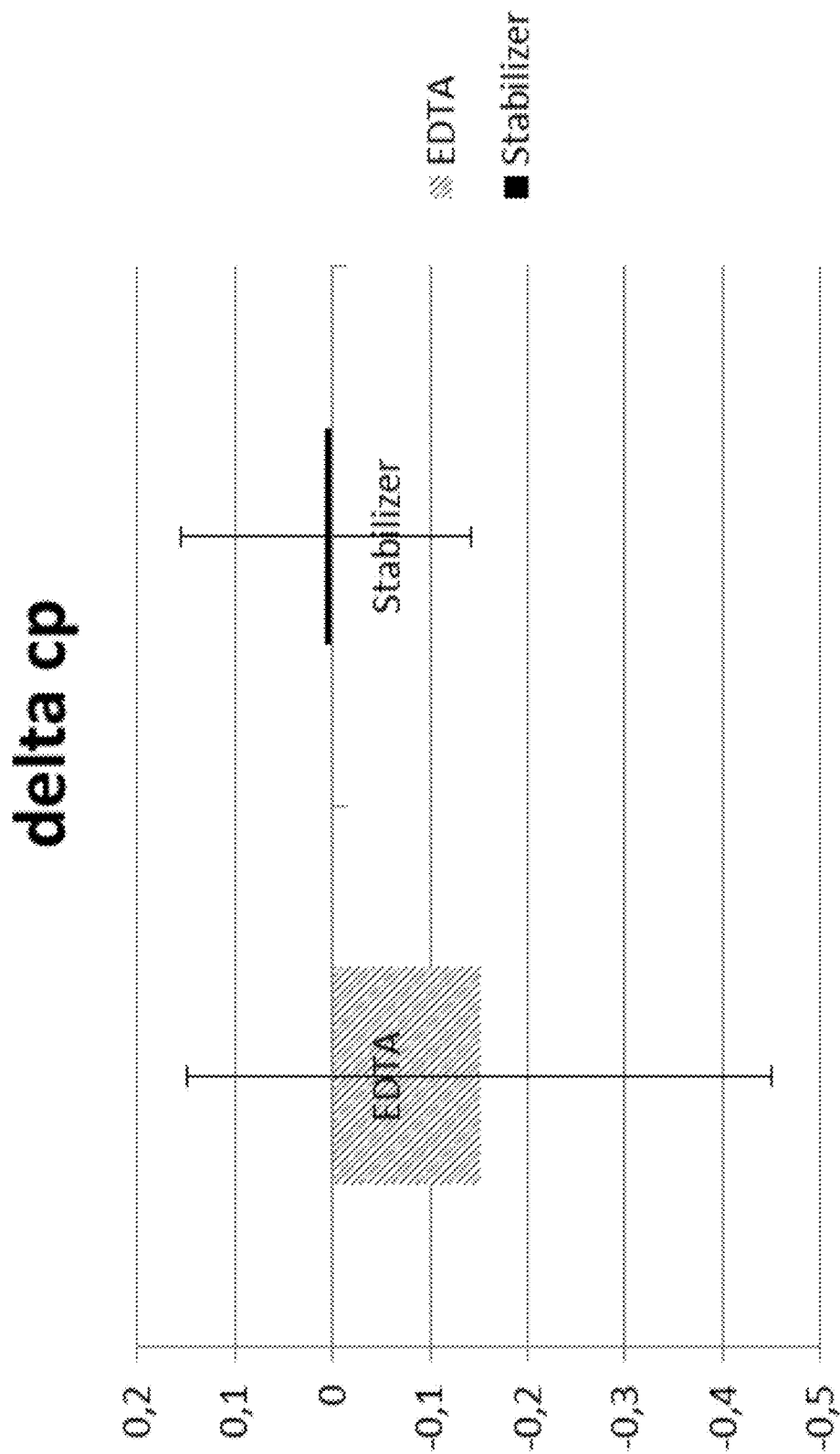
FIG. 3 Influence of storage on DNA yield. Samples were stored in EDTA or EDTA supplemented with glutathione, SkQ1 and Pefabloc® SC ("Stabilizer 3"), as indicated in Example 3.

The differences in crossing points (term definition see Example 4) caused by storage of the samples at room temperature for 48 hours are shown in FIG. 3. There was no significant degradation of DNA in both conditions tested. In the presence of Stabilizer 3 however, reduced sample-to-sample variation was observed, and also a reduction of intra-assay variation.

Example 4

Preservation of RNA

Blood samples from breast cancer patients containing circulating tumor cells were collected either in citrate (11.7 mM)/citric acid (2.1 mM), NaH$_2$PO$_4$ (2.1 mM), Dextrose (20.1 mM), Adenine (0.24 mM) and SkQ1 (100 nM), designated as "Stabilizer 4", or in CellSave (Veridex Cell Save Preservative tube, Cat. No. 7900005). Samples #59, #60, #62, #63, #58 were stored for 48 hours at room temperature, samples #55, #56 and #57 were stored for 72 hours at room temperature. Nucleated cells were enriched by erythrocyte lysis. Aliquots of 350 µl blood sample was mixed with 1,000 µl of lysis buffer (80 mM NH$_4$Cl, 10 mM Hepes, 0.1 mMEDTA) incubated for 10 min at room temperature, centrifuged for 15 min at 300×g, washed with 1,000 µl of lysis buffer, centrifuged at 300×g for 15 min. The pellet war dissolved in 200 µl of PBS and RNA isolated from these cells with High Pure RNA Isolation Kit from Roche Applied Science, Cat. No. 11828665001. The columns were eluted with 56 µl of elution buffer. 2 µl aliquots from the isolated RNAs was reverse transcribed using the Transcriptor first strand cDNA Synthesis kit (Roche Applied Science, Cat. No. 04897030001) in reaction volumes of 20 µl. Aliquots of 5 µl cDNA were amplified with the LightCycler 480 Probes Master in a LightCycler 480 instrument. The primers and probes that were used are described in Table 1.

TABLE 1

| RNA target | forward primer | reverse primer | detection probe |
|---|---|---|---|
| E-Cadherin | 5'-GGT TAA GCA CAA CAG CAA CA-3'; SEQ ID NO: 4 | 5'- CAC CTG ACC CTT GTA CGT-3'; SEQ ID NO: 5 | 5'-CAC AGT CAC TGA CAC CAA CGA TAA TCC TCC GA-3' SEQ ID NO: 6 § |
| cMyc | 5'-CCC CTG GTG CTC CAT GAG GA-3'; SEQ ID NO: 7 | 5'-CTC ATC TTC TTG TTC CTC CTC AGA-3'; SEQ ID NO: 8 | 5'-ACA CCG CCC ACC ACC AGC AGC G-3' SEQ ID NO: 9 § |
| EpCam | 5'-GTT TGC GGA CTG CAC TTC AG -3'; SEQ ID NO: 10 | 5'-AGG ATT CAC TTT TAA CAT CTT TTT-3'; SEQ ID NO: 11 | 5'-TGA GAA TAA TGT TAT CAC TAT TGA TCT-3' SEQ ID NO:12 § |
| muc 1 | 5'-ATT TCT GAA ATG TTT TTG CAG ATT TA -3'; SEQ ID NO: 13 | 5'-TGG CAC ATC ACT CAC GCT GA-3'; SEQ ID NO: 14 | 5'-ATT AAG TTC AGG CCA GGA TCT GTG G-3' SEQ ID NO: 15 § |
| cyclin | 5'-CCG TCC ATG CGG AAG ATC-3' SEQ ID NO: 16 | 5'-GAA GAC CTC CTC CTC GCA CT-3' SEQ ID NO: 17 | 5'-TCT GTT CCT CGC AGA CCT CCA GCA-3' SEQ ID NO: 18 $ |
| CAV1 | 5'-ACA GCC CAG GGA AAC CTC- 3' SEQ ID NO: 19 | 5'-GGA TGG GAA CGG TGT AGA GA- 3' SEQ ID NO: 20 | Roche Applied Science, Universal ProbeLibrary probe: # 42 |
| CK1 8 | 5'-TGA TGA CAC CAA TAT CAC ACG A-3' SEQ ID NO: 21 | 5'-GGC TTG TAG GCC TTT TAC TTC C- 3' SEQ ID NO: 22 | Roche Applied Science, Universal ProbeLibrary probe: #78, cat. no. 04689011001 |
| PPIA | Roche Applied Science, Universal ProbeLibrary Human PPIA Gene Assay, Cat. No.: 05189268001 | | |
| TBP | Roche Applied Science, Universal ProbeLibrary Human TBP Gene Assay, Cat no: 05189268001 | | |
| beta2m | Roche Applied Science, Universal ProbeLibrary Human β2M Gene Assay, Cat. No.: 05189390001 | | |
| GAPDH | Roche Applied Science, Universal ProbeLibrary Human GAPD Gene Assay, Cat. No.: 05190541001 | | |

§ includes 5'FAM label, and 3'-BHQ2 label
$ includes 5'FAM label, and 3'-TAMRA label Real-time PCR including RT (=reverse transcription)-PCR use the linearity of DNA amplification to determine absolute or relative amounts of a known sequence in a sample. By using a fluorescent reporter in the reaction, DNA generation is monitored at each cycle of PCR. When the DNA is in the log linear phase of amplification, the amount of fluorescence increases above the background. The amplification cycle during which the fluorescence becomes measurable against background is called the threshold cycle or "crossing point".

Results are shown in Tables 2a-2d. In each section (2a-2d) the first line indicates the sample number and the respective storage time at room temperature. The second line specifies the type of stabilizer reagent. RT-PCR was performed in duplicates, indicated as "Test A" and "Test B". The numbers in the table are the crossing points obtained after real-time RT-PCR. "neg" indicates negative results.

TABLE 2a

| | sample # 59 (48 h) | | | | sample # 60 (48 h) | | | |
| | Stabilizer 4 | | CellSave | | Stabilizer 4 | | CellSave | |
| RNA target | Test A | Test B | Test A | Test B | Test A | Test B | Test A | Test B |
| --- | --- | --- | --- | --- | --- | --- | --- | --- |
| E_Cadherin | 34.17 | 34.49 | neg | neg | 31.62 | 31.42 | neg | neg |
| cMyc | 28.29 | 27.92 | 38.57 | neg | 28.49 | 28.12 | 38.19 | 37.11 |
| EpCam | 38.84 | 40.82 | neg | neg | 36.07 | 34.97 | neg | neg |
| muc 1 | 35.08 | 35.1 | neg | neg | 34.94 | 34.65 | neg | neg |
| cyclin | 36.32 | 37.12 | neg | neg | 34.81 | 34.81 | neg | neg |
| CAV | 37.08 | 36 | neg | neg | 36.71 | 36.16 | neg | neg |
| ck18 | 32.98 | 33.14 | neg | neg | 31.53 | 31.57 | 42.01 | neg |
| PPIA | 23.2 | 23.17 | 35.95 | 35.67 | 21.34 | 21.03 | 31.83 | 33.14 |
| TBP | 31.13 | 31.1 | neg | neg | 29.91 | 29.65 | neg | neg |
| beta2m | 20.02 | 19.98 | 36.73 | 36.29 | 19.09 | 18.8 | 34.78 | 34.67 |
| GAPDH | 23.83 | 23.74 | 37.85 | 36.76 | 22.54 | 22.56 | 35.02 | 35.12 |

TABLE 2b

| | sample # 62 (48 h) | | | | sample # 63 (48 h) | | | |
| | Stabilizer 4 | | CellSave | | Stabilizer 4 | | CellSave | |
| RNA target | Test A | Test B | Test A | Test B | Test A | Test B | Test A | Test B |
| --- | --- | --- | --- | --- | --- | --- | --- | --- |
| E_Cadherin | 33.34 | 33.24 | neg | neg | 31.89 | 32.5 | neg | neg |
| cMyc | 28.47 | 28.45 | neg | 35.96 | 26.79 | 26.81 | 35.93 | 35.82 |
| EpCam | 38.52 | 38.36 | neg | neg | 39.09 | 37.92 | neg | neg |
| muc 1 | 34.56 | 34.23 | neg | neg | 32.85 | 32.66 | neg | neg |
| cyclin | 35.84 | 36.2 | neg | neg | 34.02 | 34.08 | 40.97 | neg |
| CAV | 37.28 | 36.5 | neg | neg | neg | neg | neg | neg |
| ck18 | 33.61 | 33.63 | neg | neg | 31.71 | 31.46 | 42.48 | neg |
| PPIA | 23.63 | 23.35 | 35.67 | 34.84 | 21.79 | 21.74 | 33.54 | 32.49 |
| TBP | 31.84 | 30.71 | neg | neg | 29.48 | 29.25 | neg | neg |
| beta2m | 20.77 | 20.54 | 35.98 | 35.32 | 19.93 | 19.68 | 35.58 | 35.19 |
| GAPDH | 24.71 | 24.67 | 38.54 | 37.51 | 23.33 | 23.11 | 35.94 | 35.48 |

TABLE 2c

| | sample #55 (72 h) | | | | sample # 56 (72 h) | | | |
| | Stabilizer 4 | | CellSave | | Stabilizer 4 | | CellSave | |
| RNA target | Test A | Test B | Test A | Test B | Test A | Test B | Test A | Test B |
| --- | --- | --- | --- | --- | --- | --- | --- | --- |
| E_Cadherin | 32.61 | 32.22 | neg | neg | 36.15 | 35.12 | neg | neg |
| cMyc | 29.34 | 29.26 | 37.92 | 37 | 30.47 | 30.3 | neg | neg |
| EpCam | 37.75 | 38.21 | neg | neg | 40.55 | 39.1 | neg | neg |
| muc 1 | 34.92 | 35.19 | neg | neg | 35.93 | 36.21 | neg | neg |
| cyclin | 36.37 | 36.67 | neg | neg | 37.82 | 37.2 | neg | neg |
| CAV | neg | neg | neg | neg | 38.04 | neg | neg | neg |
| ck18 | 32.16 | 32.14 | 45 | neg | 33.21 | 33.02 | neg | 45 |
| PPIA | 21.88 | 21.76 | 34.46 | 34.35 | 23 | 22.96 | 35.53 | 34.66 |
| TBP | 30.43 | 30.25 | neg | neg | 31.94 | 31.84 | neg | neg |
| beta2m | 22.07 | 21.88 | 36 | 35.55 | 22.13 | 21.96 | 37.05 | 37.3 |
| GAPDH | 24.18 | 23.98 | 37.78 | 36.55 | 24.54 | 24.61 | neg | 39.92 |

TABLE 2d

| | sample #57 (72 h) | | | | sample #58 (48 h) | | | |
| | Stabilizer 4 | | CellSave | | Stabilizer 4 | | CellSave | |
| RNA target | Test A | Test B | Test A | Test B | Test A | Test B | Test A | Test B |
| --- | --- | --- | --- | --- | --- | --- | --- | --- |
| E_Cadherin | 35.33 | 35.44 | neg | neg | 34.2 | 34.05 | neg | neg |
| cMyc | 29.74 | 29.33 | 38.05 | 38.27 | 27.8 | 27.67 | 38.84 | 38.06 |
| EpCam | 38.67 | 40.03 | neg | neg | 40.72 | 37.68 | neg | neg |
| muc 1 | 35.63 | 35.15 | neg | neg | 34.5 | 34.79 | neg | neg |
| cyclin | 37.04 | 36.93 | neg | neg | 35.58 | 35.37 | neg | neg |
| CAV | neg | 37.65 | neg | neg | neg | 36.87 | neg | neg |
| ck18 | 33.33 | 33.29 | neg | neg | 32.58 | 32.51 | neg | 42.45 |

TABLE 2d-continued

|  | sample #57 (72 h) | | | | sample #58 (48 h) | | | |
| --- | --- | --- | --- | --- | --- | --- | --- | --- |
|  | Stabilizer 4 | | CellSave | | Stabilizer 4 | | CellSave | |
| RNA target | Test A | Test B | Test A | Test B | Test A | Test B | Test A | Test B |
| PPIA | 23.51 | 23.32 | 35.02 | 35.52 | 22.66 | 22.58 | 35.78 | 35.02 |
| TBP | 31.3 | 30.99 | neg | 40.82 | 31.1 | 30.88 | neg | neg |
| beta2m | 22.07 | 21.87 | 39.52 | neg | 20.59 | 20.3 | 36.73 | 37.8 |
| GAPDH | 24.64 | 24.21 | 38.44 | neg | 23.95 | 23.89 | 39.15 | 38.82 |

The RNA molecules indicated above are known to be specific for certain types of circulating tumor cells. Thus, the RNAs coding for E-Cadherin, EpCam, Muc 1, cyclin, CAV and CK18 surprisingly remained detectable in the samples preserved with Stabilizer 4. The cMyc RNA which was also expressed in leukocytes was detectable with the stabilizer reagent CellSave as well, but with a strong shift in crossing points. This indicated that the respective RNA level was decreased by several orders of magnitude.

The housekeeping gene RNAs PPIA, TBP, beta2m and GAPDH used as controls were detectable in all samples. The samples stabilized with CellSave however showed very high crossing points and therefore very low RNA levels.

This example shows that RNA in blood samples stored for 48 hours or 72 hours can be preserved in the Stabilizer 4 reagent.

Example 5

Quantification of RNA from Cells Isolated after 72 h Sample Storage

MDA-MB-468 cells were spiked into blood samples obtained from two healthy individuals at $14.4 \times 10^6$ cells/ml. From each donor four samples were prepared. Sample 1 and 2 contained EDTA as anticoagulant only and no additive, sample 3 and 4 were stabilized with citrate (11.7 mM), citric acid (2.1 mM), $NaH_2PO_4$ (2.1 mM), Dextrose (20.1 mM), Adenine (0.24 mM), Pefabloc® SC (0.25 mM), SS-31 (1 µM) and acetylsalicylic acid (1 mM) as stabilizer ("Stabilizer 5"). Aliquots from these samples were processed immediately after set up, other aliquots were processed after storage at room temperature for 72 hours. MDA-MB-468 cells were isolated from blood by capturing with BreastSelectBeads from Adnagen Cat. No.: T1-508 with 1,000 µl aliquots of sample material according to the protocol recommended by the manufacturer.

The bead captured purified cells were resuspended in 1,000 µl PBS. With 200 µl aliquots RNA was isolated using the MagNA Pure LC DNA Isolation Kit—Large volume Cat No 03310515001 using the Program "DNA LV Blood_20_200" and an elution volume of 100 µl.

The RNA was transcribed into cDNA using Transcriptor First Strand cDNA Synthesis Kit Cat. No: 04897030001 in reactions of 70 µl volume, each reaction containing 12.5 µl of isolated nucleic acid. PCR was peformed with the with the LightCycler 480 Probes Master in a LightCycler 480 instrument in 20 µl reactions containing 5 µl of the cDNA samples. Initial denaturation was for 10 min at 95° C., 50 cycles with 10 seconds denaturation at 95° C. and annealing/elongation at 58° C. for 1 min. Detection format: Dual color hydrolysis Probe UPL (Universal Probe Library, Roche Diagnostics GmbH Mannheim, Germany) probe as indicated below. Table 3 describes the primer/probes for the RNA/DNA targets analysed.

To quantify the changes in expression level of the RNA target tested, the relative quantification method of Livak and Schmittgen was used (Livak K. J. and Schmittgen T. D., Methods 2001, 25(4) 402-408). In order to provide a reference for normalization of the RNA values obtained, the GCK target was amplified from the DNA present in the total nucleic acid preparation.

Figure 4:
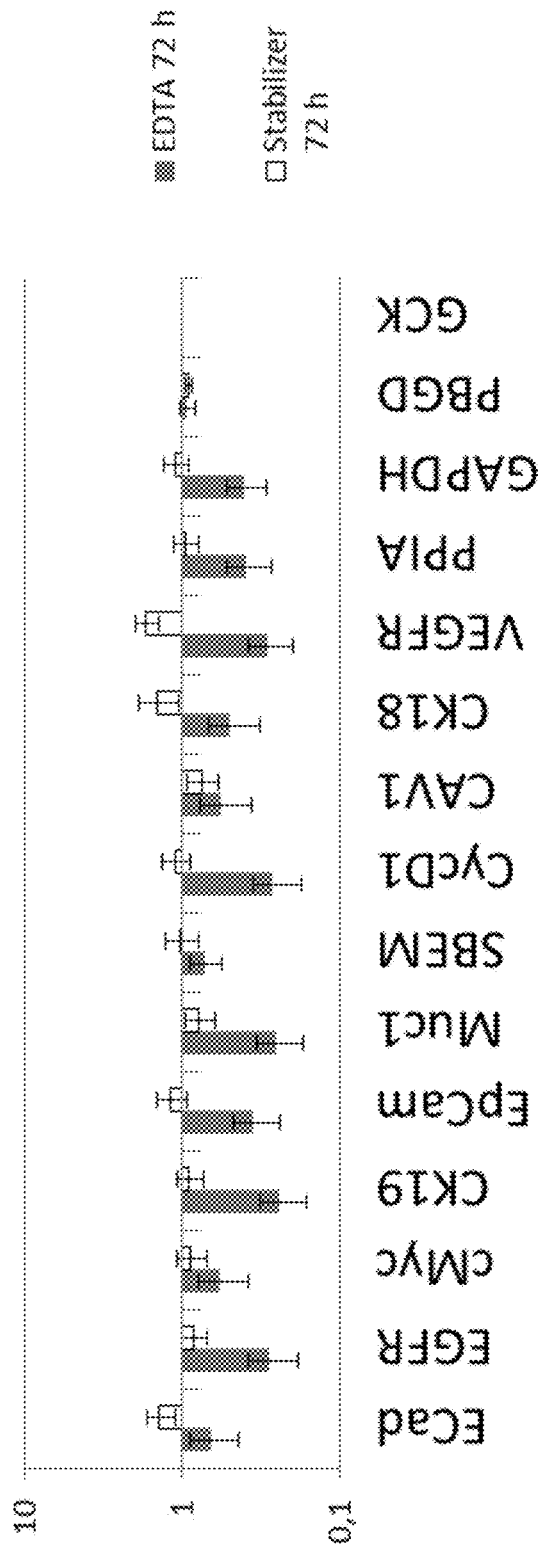
FIG. 4 Blood from two blood donors was collected either in EDTA or in stabilizer as described in Example 5. Samples were spiked with MDA-MB-468 cells. Immediately and following a 72 hours long incubation at room temperature, the MDA-MB-468 cells were isolated and the nucleic acids were extracted. The set of nucleic acid parameters depicted in the figure was amplified by RT-PCR or PCR (depending on the template); changes of the respective nucleic acid levels were calculated using GCK DNA as endogenous reference. "Stabilizer 72 h" refers to the samples incubated for 72 hours with Stabilizer 5 as described in Example 5.

FIG. 4 show a strong decline in RNA levels from cells isolated from blood stored in EDTA. When the cells were isolated from blood stored in Stabilizer 5, very little influence on the RNA was observed. The expression pattern was only slightly affected during storage.

TABLE 3

| Target | Template | forward primer | reverse primer | detection probe |
| --- | --- | --- | --- | --- |
| E-Cadherin | RNA | 5'-GGT TAA GCA CAA CAG CAA CA-3' SEQ ID NO: 23 | 5'-CAC CTG ACC CTT GTA CGT-3' SEQ ID NO: 24 | 5'-CAC AGT CAC TGA CAC CAA CGA TAA TCC TCC GA-3' SEQ ID NO: 25 § |
| EGFR | RNA | 5'-CAG GAC CAA GCA ACA TGG-3' SEQ ID NO: 26 | 5'-CAC ATC TCC ATC ACT TAT CTC CTT-3' SEQ ID NO: 27 | 5'-TGC AGT CGT CAG CCT GAA CAT AAC ATC CTT-3' SEQ ID NO: 28 § |
| cMyc | RNA | 5'-CCC CTG GTG CTC CAT GAG GA-3' SEQ ID NO: 29 | 5'-CTC ATC TTC TTG TTC CTC CTC AGA-3' SEQ ID NO: 30 | 5'-ACA CCG CCC ACC ACC AGC AGC G-3' SEQ ID NO: 31 § |
| CK19 | RNA | 5'-CGG GAC AAG ATT CTT GGT GC-3' SEQ ID NO: 32 | 5'-CGT ACT GAT TTC CTC CTC ATG-3' SEQ ID NO: 33 | 5'-ACC AAG TTT GAG ACG GAA CAG GC-3' SEQ ID NO: 34 § |

TABLE 3-continued

| Target | Template | forward primer | reverse primer | detection probe |
|---|---|---|---|---|
| EpCam | RNA | 5'-GTT TGC GGA CTG CAC TTC AG-3' SEQ ID NO: 35 | 5'-AGG ATT CAC CTT TAA CAT CTT TTT-3' SEQ ID NO: 36 | 5'-TGA GAA TAA TGT TAT CAC TAT TGA TCT G-3' SEQ ID NO: 37 § |
| Muc 1 | RNA | 5'-ATT TCT GAA ATG TTT TTG CAG ATT TA -3' SEQ ID NO: 38 | 5'-TGG CAC ATC ACT CAC GCT GA -3' SEQ ID NO: 39 | 5'-ATT AAG TTC AGG CCA GGA TCT GTG G-3' SEQ ID NO: 40 § |
| SBEM | RNA | 5'-TCT CTG CCC AGA ATC CGA C-3' SEQ ID NO: 41 | 5'-TTG GGT AAA ACT GGA ATG TCT T-3' SEQ ID NO: 42 | 5'-TAT CCA GCT ACT GGT CCT GCT GA-3' SEQ ID NO: 43 § |
| Cyclin D1 | RNA | 5'-CCG TCC ATG CGG AAG ATC-3' SEQ ID NO: 44 | 5'-GAA GAC CTC CTC CTC GCA CT-3' SEQ ID NO: 45 | 5'-TCT GTT CCT CGC AGA CCT CCA GCA -3' SEQ ID NO: 46 $ |
| CAV1 | RNA | 5'-ACA GCC CAG GGA AAC CTC-3' SEQ ID NO: 47 | 5'-GGA TGG GAA CGG TGT AGA GA-3' SEQ ID NO: 48 | Roche Applied Science, Universal ProbeLibrary probe: # 42 |
| CK18 | RNA | 5'-TGA TGA CAC CAA TAT CAC ACG A-3' SEQ ID NO: 49 | 5'-GGC TTG TAG GCC TTT TAC TTC C-3' SEQ ID NO: 50 | Roche Applied Science, Universal ProbeLibrary probe: #78, cat. no. 04689011001 |
| VEGFR | RNA | 5'-TTC CTG ACC TTG GAG CAT CTC A-3' SEQ ID NO: 51 | 5'-GGT CCC TGT GGA TAC ACT T -3' SEQ ID NO: 52 | 5'-AAG TGG CTA AGG GCA TGG AGT TCT TGG CAT -3' SEQ ID NO: 53 § |
| PPIA | RNA | Roche Applied Science, Universal ProbeLibrary Human PPIA Gene Assay, Cat. No.: 05189268001 | | |
| GAPDH | RNA | Roche Applied Science, Universal ProbeLibrary Human GAPD Gene Assay, Cat.No.: 05190541001 | | |
| PBGD | DNA | 5'GGC TCT TTC TGT CCG GC-3' SEQ ID NO: 54 | 5'-CCA CAC TCT CCT ATC TTT ACT-3' SEQ ID NO: 55 | 5'-TTA CCA AGG AGC TTG AAC ATG CCC TGG AGA-3' SEQ ID NO:56 § |
| GCK | DNA | 5'CTT TCC TGT GAG GCA CGA AGA-3' SEQ ID NO: 57 | 5'GCA GAG TTC CTC TGG GGT-3' SEQ ID NO: 58 | 5'-CAG AAG GCA GAT GAG GGG AGG CAC AGG-3' SEQ ID NO: 59 § |

§ includes 5'FAM label, and 3'-BHQ2 label
$ includes 5'FAM label, and 3'-TAMRA label Example 6

Isolation of Viable Cells after Sample Storage for 48 Hours

MDA-MB-468 cells were spiked into blood samples obtained from healthy individuals to result in a final concentration of 300,000 spiked cells/ml blood. The samples were processed either immediately or after storage at room temperature for 48 hours. Sample 1 contained EDTA as anticoagulant only and no further additive, sample 2 contained citrate (11.7 mM)/citric acid (2.1 mM), NaH$_2$PO$_4$ (2.1 mM), Dextrose (20.1 mM), Adenine (0.24 mM), Pefabloc® SC (0.25 mM), SS-31 (1 µM) and acetylsalicylic acid (1 mM) as stabilizer ("Stabilizer 5", see Example 5).

Immediately after sample set up and 48 hours later nucleated cells were enriched by erythrocyte lysis. Aliquots of 1 ml blood were mixed with 4 ml of lysis buffer (80 mM NH$_4$Cl, 10 mM Hepes buffer, 0.1 mM EDTA) and incubated for 10 min at room temperature. After centrifugation at 200×g for 15 min, the supernatant was removed and the pellet was resuspended in 2 ml of PBS/3 mM EDTA. The cells were sedimented by centrifugation at 200×g for 15 min. The supernatant was removed and the cell pellets resuspended in 300 µl of PBS supplemented with 2 mM EDTA and 0.5% BSA.

From these samples the MDA-MB-468 cells were isolated using CD326 (EpCAM) Microparticles from Miltenyi (Cat No 130-061-101), MS columns and the MACS separator system (Milteny Cat. Nos. 130-042-201, 130-042-102) making use of the protocol recommended by the manufacturer.

The enriched cells were suspended in 300 µl of RPMI medium.

The viability of the cells was tested with the Trypan blue exclusion method. 10 µl of each sample was mixed with 10 µl of Trypan blue (Sigma-Aldrich T8154). The number of MDA-MB-468 cells excluding the dye was counted in a Neubauer chamber. The yield of viable cells was calculated using the cell number spiked into the blood samples as 100%.

Table 4 shows the results obtained with blood samples from two donors. Stabilizer 5 can preserve a significant number of cells. When just EDTA is used as a stabilizing agent the cell viability is negatively affected, to a surprisingly significant extent.

TABLE 4

| Donor | Anti-coagulant/ Stabilizer | Percentage of isolated viable cells after storage for 48 h, erythrocyte lysis and immunomagnetic enrichment |
|---|---|---|
| #1 | EDTA | 16 |
| #1 | Stabilizer 5 | 44 |
| #2 | EDTA | 9 |
| #2 | Stabilizer 5 | 46 |

Example 7

Cells Isolated from Stabilized Blood are Culturable

MDA-MB-468 cells treated and isolated as described in Example 6 were seeded into the wells of an E-Plate 96-well device (Roche Applied Science, Cat. No. 06472451001, Roche Diagnostics GmbH Mannheim, Germany) for the Real-Time Cell Analyzer (RTCA) MP (xCELLigence system). 50 µl aliquots of cells were seeded into wells containing 50 µl of RPMI medium. Duplicates were used for analysis. The E-Plate was incubated over night at 37° C. in an incubator to allow attachment of MDA-MB-468 cells to the bottom of the E-Plate. In order to remove contaminating blood derived cells the medium was removed and cells attached to the culture plate were washed 3 times with PBS. 150 µl of fresh RPMI medium was added per well and the E-Plate transferred to the Real-Time Cell Analyzer. Cell index was measured once per hour for 101 hours.

Figure 5:
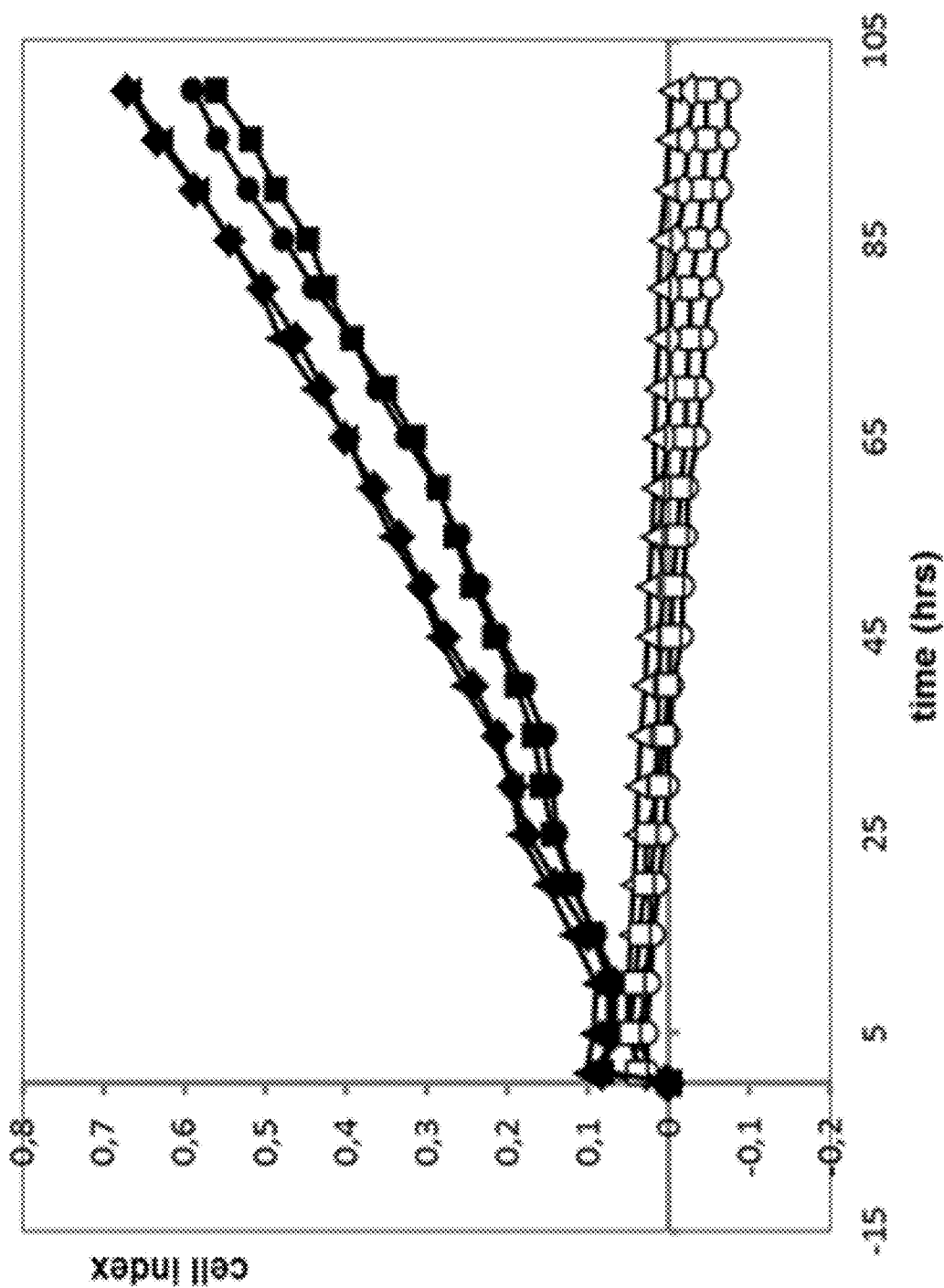
FIG. 5 Blood from 2 different donors was either stabilized with EDTA or with stabilizer. MDA-MB-468 cells were spiked to the blood samples. The samples were stored for 48 hours at room temperature. MDA-MB-468 cells were enriched by erythrocyte lysis and immunomagnetic isolation using CD326 (EpCAM) Microparticles (see Example 7). The cells were cultured for more than 100 hrs.

The result is shown in FIG. 5. Cell growth can be observed with cells isolated from blood stored for 48 hours in stabilizer described in this invention.

A comparison was made with cells stabilized with EDTA, only. As it turned out, the cells isolated from blood stored with just EDTA for 48 hours are not culturable anymore.

The invention claimed is:

1. A method for stabilizing intact nucleated cells of a whole-blood sample ex-vivo, the method comprising the steps of
   (a) providing the whole blood sample ex-vivo;
   (b) contacting and mixing the sample of step (a) with an aqueous solution comprising 11.1 mM-12.3 mM trisodium citrate, 2 mM-2.2 mM citric acid, 2 mM-2.2 mM $NaH_2PO_4$, 19.1 mM-21.1 mM glucose, 0.23 mM-0.25 mM adenine, 0.24 mM-0.26 mM AEBSF, (4-(2-Aminoethyl)benzenesulfonyl fluoride) 990 nM-1.1 µM SS-31 and 990 µM-1.1 mM acetylsalicylic acid, wherein the solution is enclosed in a blood drawing container;
   (c) incubating the mixture obtained in step (b), thereby stabilizing intact nucleated cells of the ex-vivo whole-blood sample.

2. The method according to claim 1, wherein the mixture obtained in step (b) is a composition comprising an amount of whole blood and an aqueous solution, the solution comprising about 11.7 mM trisodium citrate, about 2.1 mM citric acid, about 2.1 mM $NaH_2PO_4$, about 20.1 mM glucose, about 0.24 mM adenine, about 0.25 mM AEBSF, 1 µM about 1 M SS-31 and about 1 mM acetylsalicylic acid.

3. The method according to claim 1, wherein step (c) is performed at room temperature for a time interval selected from the group consisting of 0 h-12 h (hours), 0 h-24 h, 0 h-36 h, 0 h-48 h, 0 h-60 h, and 0 h-72 h.

4. The method of claim 1, the method further comprising the steps of
   (d) separating intact nucleated cells from the incubated mixture obtained in step (c); and
   (e) lysing the separated nucleated cells and detecting an analyte of nucleated cells in the lysate, wherein the analyte is selected from the group consisting of DNA, RNA, and protein.

5. The method according to claim 1, the method further comprising the steps of
   (d) separating intact nucleated cells from the incubated mixture obtained in step (c);
   (e) contacting the separated nucleated cells of step (d) with a culture medium, and culturing viable cells.

6. The method according to claim 1, wherein step (c) is performed at room temperature for a time interval of 12 h-72 h.

7. The method according to claim 1, wherein stabilizing is preserving and maintaining in the nucleated cells the cellular proteins and the cellular DNA as well as the cellular RNA at the time of sampling.

8. The method according to claim 1, wherein stabilizing is preserving and maintaining in the nucleated cells the composition of cellular mRNA reflecting the gene expression status at the time of sampling.

9. The method of claim 1, wherein the mixture is capable of being stabilized for up to 48 hours at room temperature.

10. The method of claim 4, wherein the mixture is capable of being stabilized for up to 72 hours at room temperature.

* * * * *